(12) United States Patent
Fitzhardinge et al.

(10) Patent No.: US 7,046,805 B2
(45) Date of Patent: May 16, 2006

(54) SYSTEM AND METHOD FOR EFFICIENTLY STORING AND PROCESSING MULTIMEDIA CONTENT

(75) Inventors: Jeremy Fitzhardinge, San Francisco, CA (US); Stephen G. Perlman, Palo Alto, CA (US)

(73) Assignee: Digeo, Inc., Kirkland, WA (US)

( * ) Notice: Subject to any disclaimer, the term of this patent is extended or adjusted under 35 U.S.C. 154(b) by 816 days.

(21) Appl. No.: 09/877,990

(22) Filed: Jun. 8, 2001

(65) Prior Publication Data

US 2002/0136406 A1 Sep. 26, 2002

Related U.S. Application Data

(60) Provisional application No. 60/277,580, filed on Mar. 20, 2001.

(51) Int. Cl.
 *H04N 7/167* (2006.01)
(52) U.S. Cl. ...................... 380/212; 380/210
(58) Field of Classification Search .............. 725/31, 725/54, 67, 68
 See application file for complete search history.

(56) References Cited

U.S. PATENT DOCUMENTS

| | | | |
|---|---|---|---|
| 4,944,008 A | 7/1990 | Piosenka et al. |
| 5,146,325 A | 9/1992 | Ng |
| 5,230,019 A | 7/1993 | Yanagimichi et al. |
| 5,371,551 A | 12/1994 | Logan et al. |
| 5,444,491 A | 8/1995 | Lim |
| 5,495,246 A | 2/1996 | Nichols et al. |
| 5,515,373 A | 5/1996 | Lynch et al. |
| 5,574,964 A | 11/1996 | Hamlin |
| 5,584,023 A | 12/1996 | Hsu |
| 5,627,539 A | 5/1997 | Lynch et al. |
| 5,631,651 A | 5/1997 | Nichols et al. |
| 5,634,074 A | 5/1997 | Devon et al. |
| 5,650,831 A | 7/1997 | Farwell |
| 5,721,727 A | 2/1998 | Ashi |
| 5,721,827 A | 2/1998 | Logan et al. |
| 5,727,233 A | 3/1998 | Lynch et al. |
| 5,732,216 A | 3/1998 | Logan et al. |
| 5,734,589 A | 3/1998 | Kostreski et al. |
| 5,734,862 A | 3/1998 | Kulas |
| 5,799,190 A | 8/1998 | Lynch et al. |
| 5,819,298 A | 10/1998 | Wong et al. |
| 5,862,220 A | 1/1999 | Perlman |
| 5,870,477 A | 2/1999 | Sasaki et al. |
| 5,883,869 A | 3/1999 | Tamai et al. |
| 5,892,536 A | 4/1999 | Logan et al. |
| 5,896,444 A | 4/1999 | Perlman et al. |
| 5,918,013 A | 6/1999 | Mighdoll et al. |
| 5,931,949 A | 8/1999 | Perlman et al. |
| 5,938,748 A | 8/1999 | Lynch et al. |
| 5,940,073 A | 8/1999 | Klosterman |

(Continued)

FOREIGN PATENT DOCUMENTS

EP 0 346 700 A2 12/1989

(Continued)

*Primary Examiner*—Gilberto Barron
*Assistant Examiner*—Venkat Perungavoor
(74) *Attorney, Agent, or Firm*—Kory D. Christensen; Stoel Rives LLP

(57) ABSTRACT

A method is described comprising: receiving a broadcast signal containing a plurality of encrypted multimedia channels; storing the encrypted multimedia channels in a first hard drive partition; and decrypting one or more of the encrypted multimedia channels to generate one or more decrypted multimedia channels; and storing the decrypted multimedia channels to a second hard drive partition.

27 Claims, 23 Drawing Sheets

U.S. PATENT DOCUMENTS

| | | |
|---|---|---|
| 5,963,909 A | 10/1999 | Warren et al. |
| 5,978,381 A | 11/1999 | Perlman et al. |
| 5,983,273 A | 11/1999 | White et al. |
| 5,986,692 A | 11/1999 | Logan et al. |
| 6,005,938 A | 12/1999 | Banker et al. |
| 6,014,693 A | 1/2000 | Ito et al. |
| 6,014,694 A | 1/2000 | Aharoni et al. |
| 6,023,585 A | 2/2000 | Perlman et al. |
| 6,026,079 A | 2/2000 | Perlman |
| 6,044,396 A | 3/2000 | Adams |
| 6,049,694 A | 4/2000 | Kassatly |
| 6,072,872 A | 6/2000 | Chang et al. |
| 6,073,168 A | 6/2000 | Mighdoll et al. |
| 6,084,583 A | 7/2000 | Gerszberg et al. |
| 6,088,455 A | 7/2000 | Logan et al. |
| RE36,801 E | 8/2000 | Logan et al. |
| 6,108,422 A | 8/2000 | Newby et al. |
| 6,118,498 A | 9/2000 | Reitmeier |
| 6,134,590 A | 10/2000 | Perlman |
| 6,138,147 A | 10/2000 | Weaver et al. |
| 6,141,356 A | 10/2000 | Gorman |
| 6,141,693 A | 10/2000 | Perlman et al. |
| 6,169,879 B1 | 1/2001 | Perlman |
| 6,188,397 B1 | 2/2001 | Humpleman |
| 6,199,076 B1 | 3/2001 | Logan et al. |
| 6,199,114 B1 | 3/2001 | White et al. |
| 6,226,241 B1 | 5/2001 | D'Amato et al. |
| 6,233,389 B1 | 5/2001 | Barton et al. |
| 6,360,368 B1 | 3/2002 | Chawla |
| 6,366,731 B1 | 4/2002 | Na et al. |
| 6,526,580 B1 | 2/2003 | Shimomura et al. |
| 6,578,070 B1 | 6/2003 | Weaver et al. |
| 6,603,488 B1 | 8/2003 | Humpleman |
| 6,611,503 B1 | 8/2003 | Fitzgerald et al. |
| 2002/0116705 A1* | 8/2002 | Perlman et al. ............ 725/31 |
| 2004/0090466 A1* | 5/2004 | Loveria, III ............ 345/781 |

FOREIGN PATENT DOCUMENTS

| | | |
|---|---|---|
| EP | 0 364 229 A2 | 4/1990 |
| EP | 0 512 398 A2 | 11/1992 |
| EP | 0 666 694 A1 | 8/1995 |
| EP | 0 676 761 A1 | 11/1995 |
| EP | 0 714 204 A2 | 5/1996 |
| EP | 0 749 244 A2 | 12/1996 |
| EP | 0 753 964 A1 | 1/1997 |
| EP | 0 756 393 A1 | 1/1997 |
| EP | 0 773 681 A2 | 5/1997 |
| EP | 0 903 738 A2 | 3/1999 |
| EP | 0 911 962 A1 | 4/1999 |
| EP | 0 971 358 A2 | 1/2000 |
| EP | 1 018 835 A2 | 7/2000 |
| EP | 1 032 195 A2 | 8/2000 |
| EP | 1 143 722 A1 | 10/2001 |
| GB | 2 333 017 A | 7/1999 |
| WO | WO 99/22513 A2 | 5/1999 |
| WO | WO 00/01149 A1 | 1/2000 |
| WO | WO 00/51129 | 8/2000 |
| WO | WO 01/04893 A1 | 1/2001 |
| WO | WO 01/37546 A6 | 5/2001 |
| WO | WO 01/74079 A1 | 10/2001 |

* cited by examiner

FIG. 7

Program Guide 500

| | 8 PM | 9 PM | 10 PM | 11 PM | 12 PM |
|---|---|---|---|---|---|
| HBOE (e.g. PID 1-5) | Prog A | Prog B | | | |
| HBOW (e.g. PID 6-10) | Prog C | Prog D | | | |
| HBOF (e.g. PID 11-15) | Prog E | | Prog F | | |
| HBOCY (e.g. PID 16-20) | Prog G | | | Prog H | |
| MAX-W (e.g. PID 21-25) | Prog I | Prog J | | | |
| MAX-E (e.g. PID 26-30) | Prog K | Prog L | | | |
| HBOSG (e.g. PID 31-35) | Prog M | Prog N | | | |

Time markers: 8:30, 9:00, 9:45, 11:15

| Block 1800 (file A) | Block 1801 (file A) | Block 1802 (file A) | Block 1803 (file A) | Block 1804 (file A) |
| --- | --- | --- | --- | --- |
| Block 1810 (file B) | Block 1811 (file B) | Block 1812 (file B) | Block 1813 (file B) | Block 1814 (file B) |
| Block 1820 (file C) | Block 1821 (file C) | Block 1822 (file C) | Block 1823 (file C) | Block 1824 (file C) |
| Block 1830 (file D) | Block 1831 (file D) | Block 1832 (file D) | Block 1833 (file D) | Block 1834 (file D) |

Head Seek Pattern Optimized for Reading

File A ⇒   File B ⇒   File C ⇒   File D ⇒

FIG. 18a

SYSTEM AND METHOD FOR EFFICIENTLY STORING AND PROCESSING MULTIMEDIA CONTENT

PRIORITY

This application claims the benefit of U.S. Provisional application No. 60/277,580 filed Mar. 20, 2001.

BACKGROUND

1. Field of the Invention

This invention relates generally to the field of multimedia systems. More particularly, the invention relates to a multimedia system capable of intelligently processing and storing several independent broadcast multimedia streams (e.g., broadcast cable or satellite streams).

2. Description of the Related Art

A prior art system for receiving broadcast multimedia signals is illustrated in FIG. 1. The system includes one or more tuners 120, 121 configured to lock on to multimedia signals 100, 101 transmitted at a carrier frequency and down-convert the signals to baseband signals. Quadrature Amplitude Modulation ("QAM") demodulators 130, 131 demodulate the baseband signals to extract the underlying digital content. As is known in the art, QAM is a modulation technique employed by cable and satellite providers that generates four bits out of one baud. For example, a 600 baud line (600 shifts in the signal per second) can effectively transmit 2,400 bps using this method. Both phase and amplitude are shaped with each baud, resulting in four possible patterns. As indicated in FIG. 1, certain multimedia systems (primarily satellite systems) use a different modulation technique known as Differential Phase Shift Keying ("DPSK") rather than QAM to demodulate the multimedia signals 100–101.

The video signal demodulated by the QAM/DPSK demodulators 130, 131 contains a plurality of statistically multiplexed multimedia streams, each containing content for a single cable or satellite "channel" (e.g., HBO). Satellite systems employ a series of transponders for receiving the multiplexed streams and cable systems typically receive the multiplexed streams over 6 Mhz channels. In either case, the multiplexed streams are transmitted at a combined data rate of approximately 40 Mbits/second, as indicated in FIG. 1.

Referring to FIG. 2, each stream/channel may be identified by a predetermined group of packet identification ("PID") codes. PID filter modules 140, 141 extract all packets from the set of multiplexed streams having PID codes associated with a specified stream (e.g., the stream which a user is currently watching). For example, in FIG. 2, PID 7 identifies the specified stream's video content and PIDs 5 and 6 identify the stream's audio left and audio right, respectively. Various additional PIDs may be associated with a stream and used to transmit channel-specific data/content (e.g., dolby digital content, . . . etc).

The multimedia content contained in the stream is then stored on a mass storage device 160, which may be used for temporary storage and/or long term storage of the content. Temporary storage features include pause and rewind functions for live television broadcasts and the ability to begin watching a program after the designated start time for the program. Long term storage functions include the ability to record entire programs for later viewing (similar to the functions provided by standard VCR). The multimedia content is then decompressed/decoded by one or more MPEG-2 decoder modules 170 before being rendered on a television display 135.

As illustrated in FIG. 1, prior art systems may also utilize a main memory 126 for storing instructions and data and a central processing unit ("CPU") 125 for executing the instructions and data. For example, the CPU may provide a graphical user interface displayed on the television, allowing the user to select certain television or audio programs for playback and/or storage on the mass storage device 120. In addition, prior art system also include one or more conditional access modules (not shown) for preventing users from viewing programs which they do not have the right to view (e.g., subscription-based channels such as HBO and pay-per-view events).

BRIEF DESCRIPTION OF THE DRAWINGS

A better understanding of the present invention can be obtained from the following detailed description in conjunction with the following drawings, in which:

FIG. 7 illustrates an embodiment in which a user may watch any program currently being broadcast from the beginning.

FIGS. 18a and 18b illustrate different embodiments for writing blocks of data.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

EMBODIMENTS OF A SYSTEM AND METHOD FOR PROCESSING MULTIPLE BROADCAST MULTIMEDIA STREAMS

Figure 1:
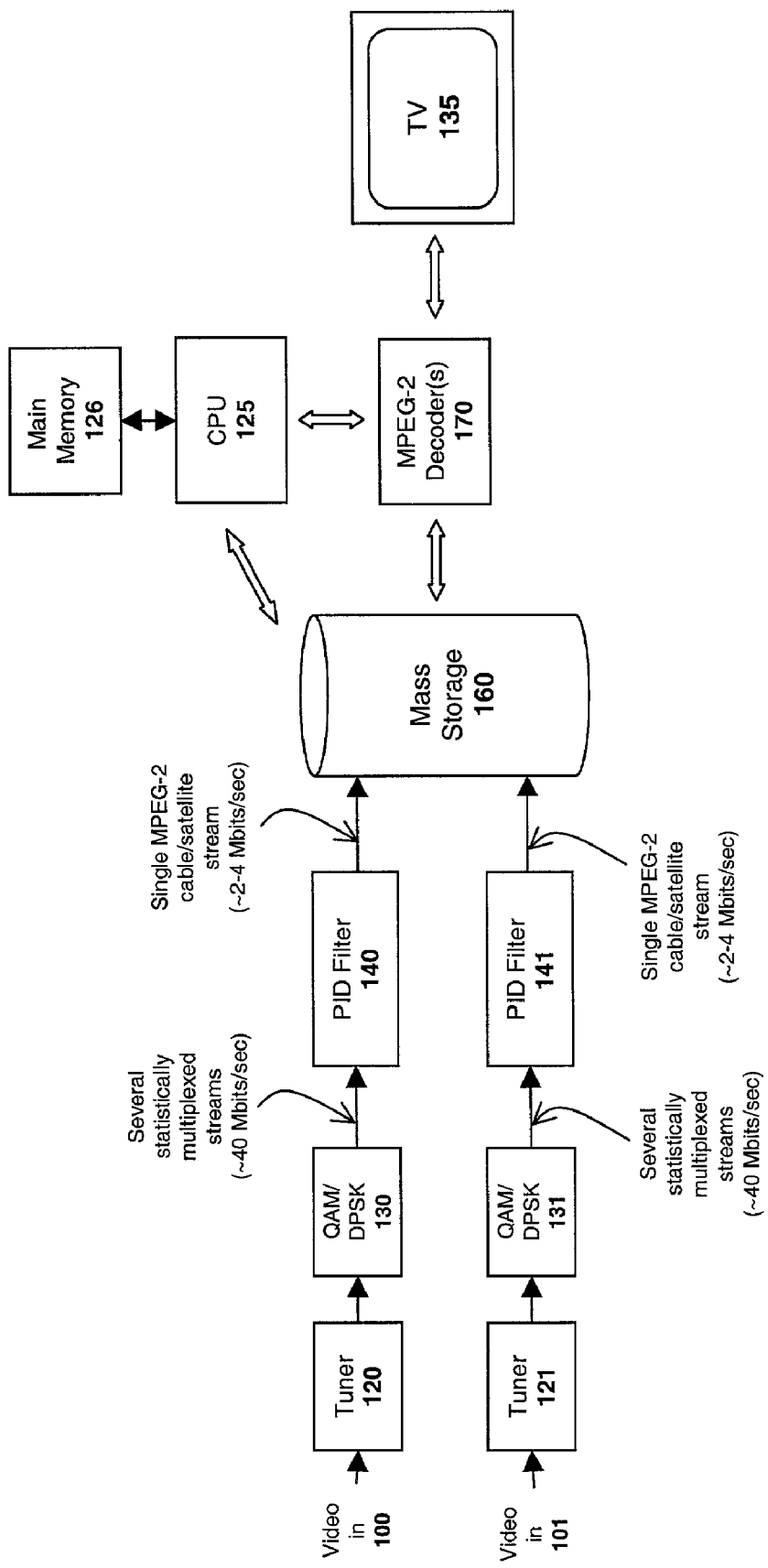
FIG. 1 illustrates a prior art multimedia receiver, storage and playback system.
Figure 2:
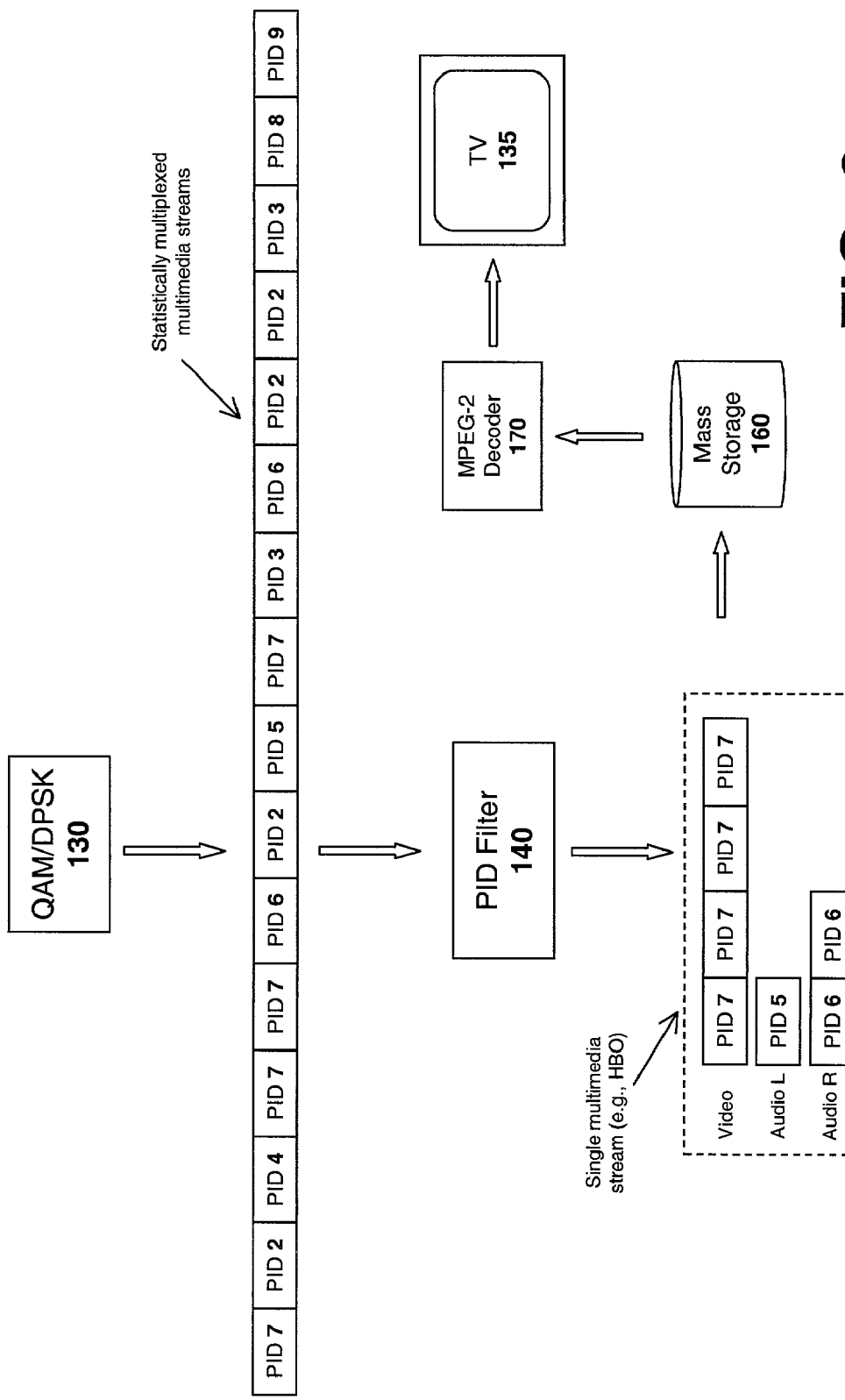
FIG. 2 illustrates packetized, statistically multiplexed multimedia content as processed by a prior art system.
Figure 3:
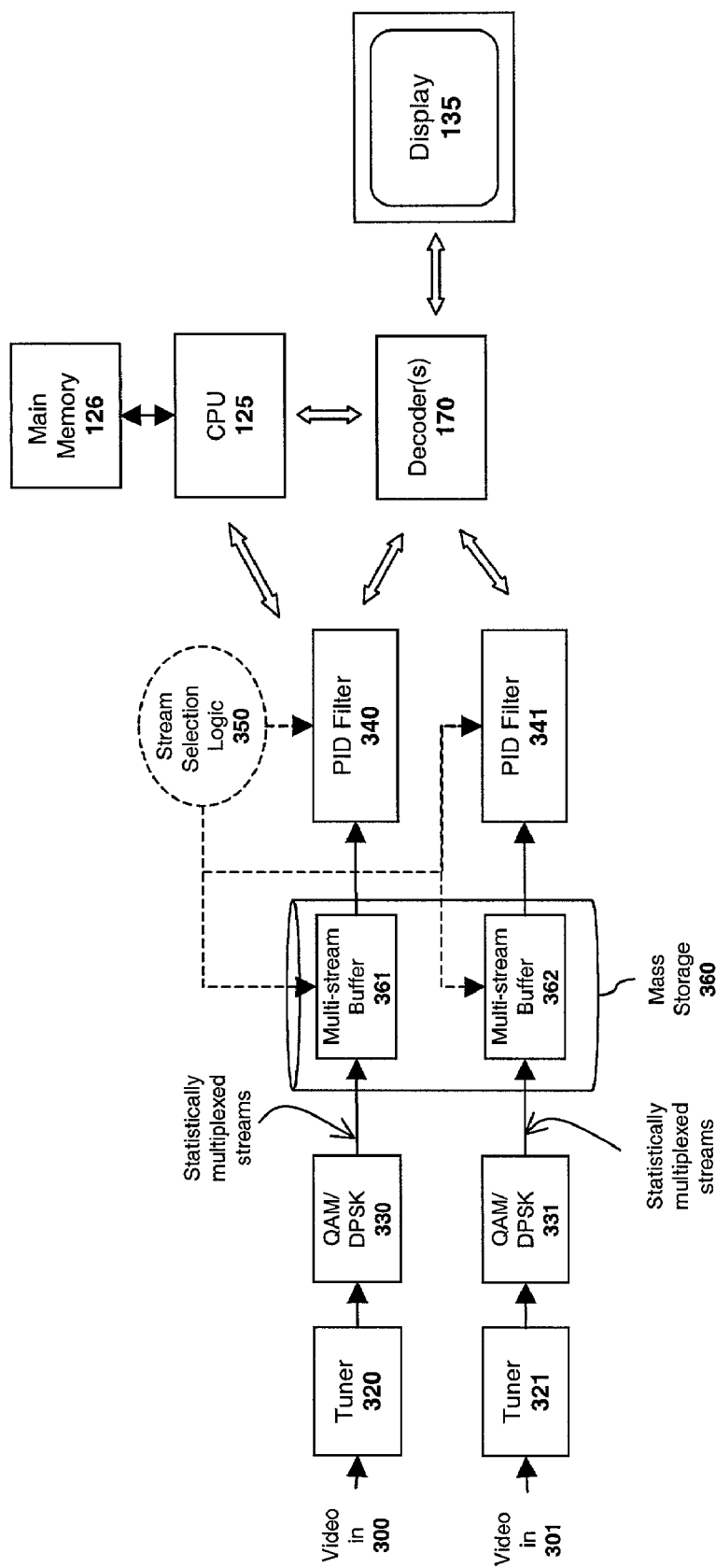
FIG. 3 illustrates one embodiment of a system for storing and processing multiple broadcast multimedia streams.

As illustrated in FIG. 3, one embodiment of the invention includes one or more tuners 320, 321 for receiving numerous statistically multiplexed streams within a specified frequency range and corresponding QAM and/or DPSK modules 330, 331 for demodulating the multiplexed streams. Unlike prior art systems, however, the system illustrated in FIG. 3 transfers all of the statistically multiplexed multimedia content (or a subset thereof) directly to multistream buffers 361, 362 on the mass storage device 360. The buffers may be configured to store a specified duration of content (e.g., two hours) and/or a specified amount of content (e.g., 80 Gbytes). When a user selects a particular cable or satellite channel, the PID filter modules 340 and 341 (also referred to herein as a "PID depacketizer") extract the multimedia packets for that channel (i.e., identified by the channel's PID codes) and reconstruct the underlying audio/video content by combining the packets in the proper order (i.e., the PID filter modules demultiplex and/or depacketize the content). One or more decoder modules 170 then decode the multimedia content using the appropriate decode/decompression algorithm (e.g., MPEG-2, MPEG-4, RealVideo® 8, Windows Media Technologies ("WMT"), . . . etc) and transmit the decoded multimedia content to a display 135 (e.g., a computer monitor or a television).

As mentioned above, if MPEG-2 is used as the compression algorithm, one set of multiplexed streams may have a combined bitrate approaching 40 Mbits/sec (or 16 Gbytes/hr); two sets, a combined bitrate of 80 Mbits/sec (or 32 Gbytes/hr) as indicated in FIG. 3. Accordingly, the mass storage device 360 of this embodiment is equipped with sufficient storage capacity and read-write bandwidth to store and process the multiplexed signal(s). More specifically, the mass storage device 360 in one embodiment is coupled to the system via an Ultra DMA-66/Ultra ATA-66 or faster interface (capable of supporting a throughput of at least 528 Mbits/sec), and has a storage capacity of 80 Mbytes or greater. It should be noted, however, that the particular interface type/speed and drive storage capacity is not pertinent to the underlying principles of the invention. For example, various different interfaces such as Small Computer System Interface ("SCSI") may be used instead of the Ultra-ATA/Ultra DMA interface mentioned above, and various different drive capacities may be employed for storing the incoming digital content.

Figure 6:
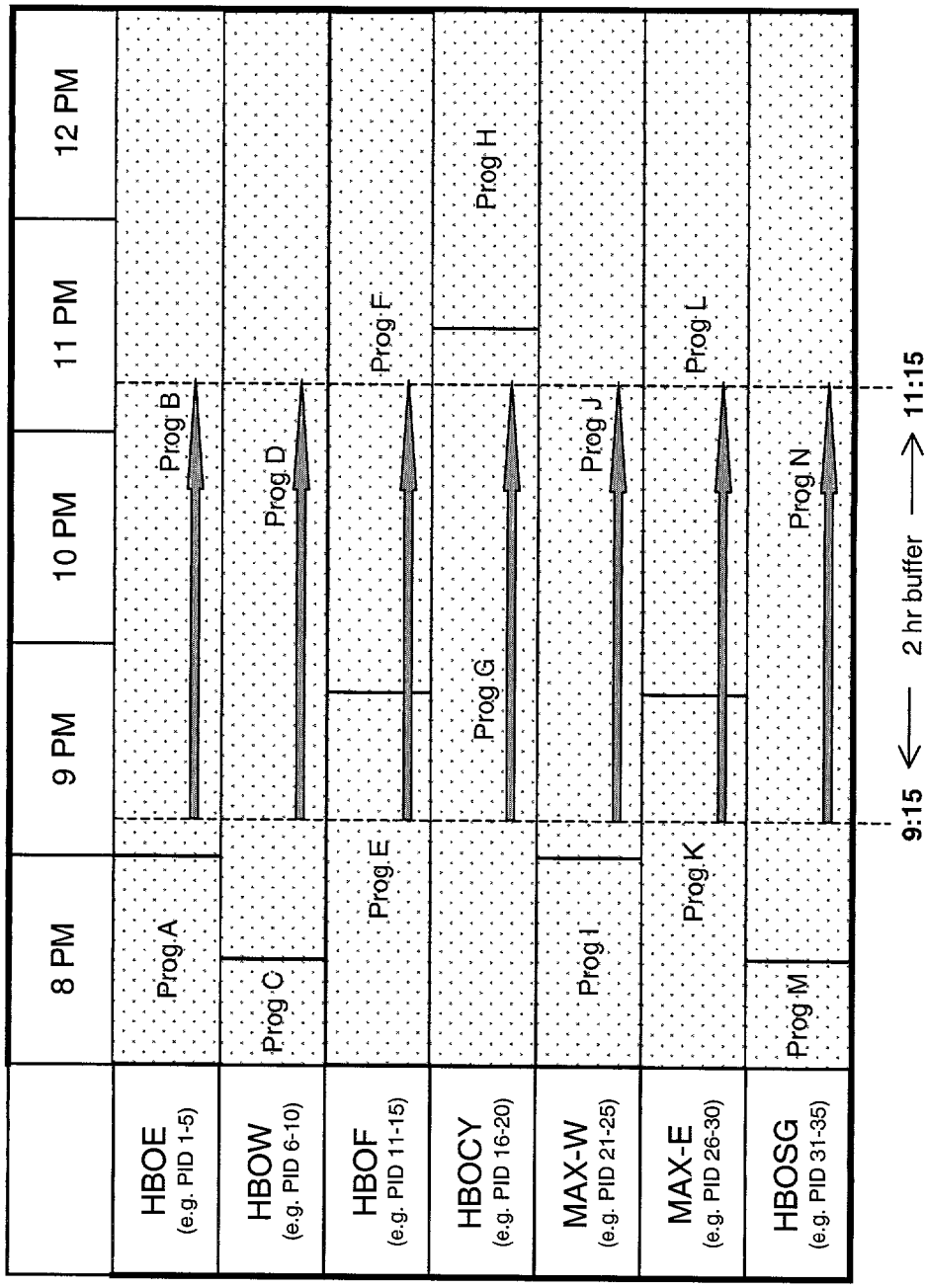
FIG. 6 illustrates operation of one embodiment which employs a buffer of a specified duration.

Storing content from multiple channels/streams on the mass storage device 360 in the foregoing manner provides numerous advantages over prior systems. More specifically, one embodiment of the invention uses the content stored in the multi-stream buffers 360, 361 to provide trick modes and other short term storage functions for all channels within the statistically-multiplexed group. For example, if a two-hour multi-stream buffer 361 is established, as indicated in the program guide 600 shown in FIG. 6, a user may pause any channel for up to two hours or rewind any channel back two hours (e.g., at 11:15 PM the user can rewind any channel back to 9:15 PM). Accordingly, if the user watching Program B on HBO East (PIDs 1–5 in the example) at 11:15, and decides to watch Program F from the beginning on the HBO Family channel (PIDs 11–15 in the example), and indicates so by choosing Program F via a remote control device or cursor control device, selection logic 350 will direct the PID filter module 340 to extract Program F from the multi-stream buffer 361. In this manner, the user will be able to view Program F in its entirety even though the broadcast of Program F started approximately 1½ hours earlier. Similarly, users may select programs on any of the other channels (e.g., Program L on Cinemax® East) broadcast up to two hours earlier. It should be noted that a two-hour buffer is described above merely for the purpose of illustration. Various alternate buffer sizes may be employed while still complying with the underlying principles of the invention.

Figure 4:
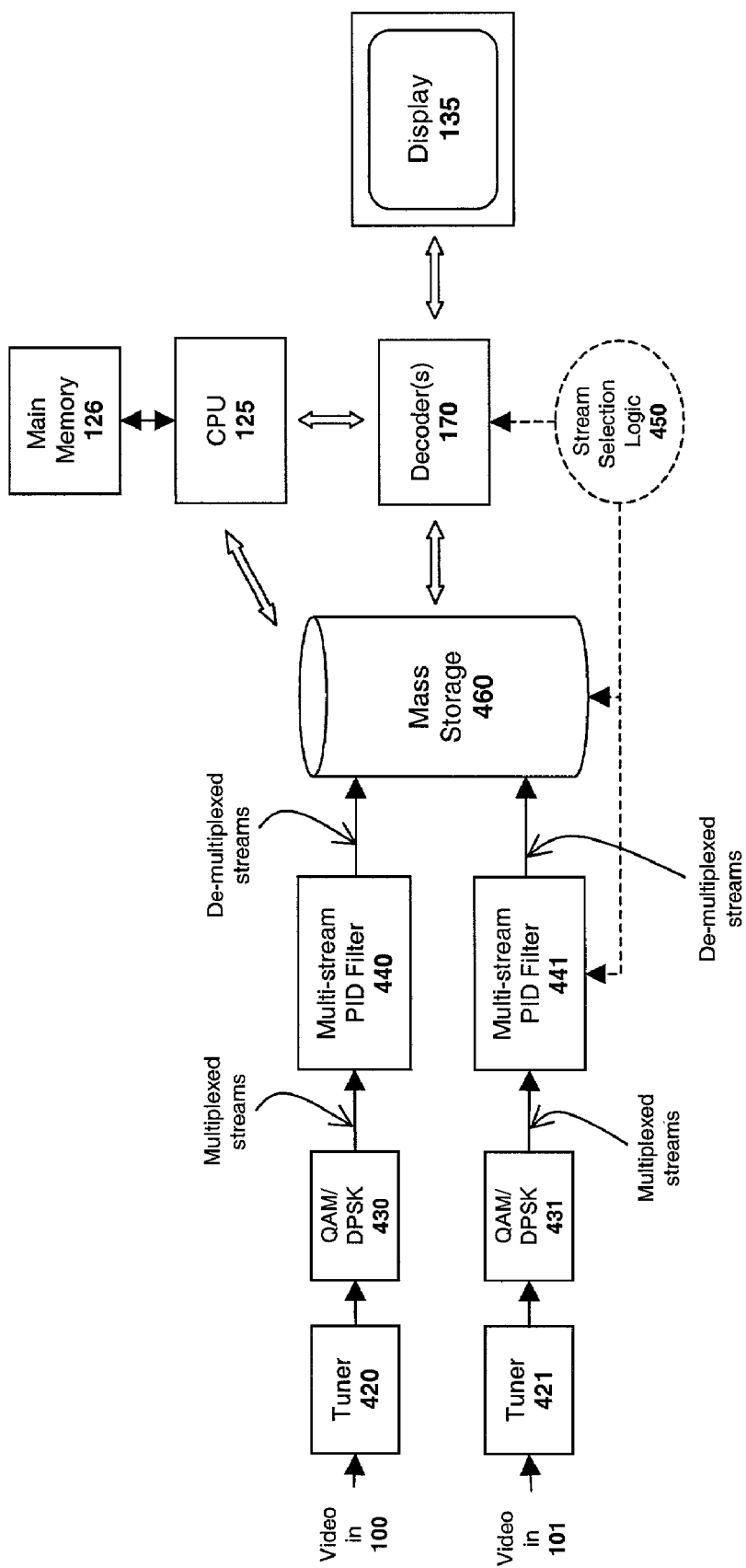
FIG. 4 illustrates an embodiment of a system for storing and processing multiple broadcast multimedia streams wherein the streams are demultiplexed before being stored.

One embodiment of the invention demultiplexes the incoming multimedia streams before storing them to a multi-stream buffer on the mass storage device 460. As illustrated in FIG. 4, this embodiment includes one or more multi-stream PID filter modules 440, 441 which extract the multimedia streams from the multiplexed signal and store them on the mass storage device 460 separated from one another. Thus, as illustrated in greater detail in FIG. 5, if the input to PID filter module 441 is a set of 'n' multiplexed streams, then the output will be 'n' independent, demultiplexed streams stored in a demultiplexed multi-stream buffer 502. Storage buffers 445, 446 may be used by each of the multi-stream PID filters 440, 441, respectively, to construct a portion of each stream (e.g., several Kbytes) before storing the portion to the mass storage device 460. This will avoid excessive seeking of the mass storage device 460 (e.g., which would result if the storage device 460 were configured to write a small amount of data such as a single PID packet for each stream at a time).

Selection logic 550, responsive to a user request to view a particular program (e.g., via remote control and/or cursor control device), will direct the decoder module 171 to read and decode one of the streams (i.e., the streams associated with PIDs 1–3 and 101–102 in the example) for rendering on a television or other display device 136. The same operations may be performed on a separate group of 'm' multiplexed streams extracted by multi-stream PID filter module 440.

Figure 5:
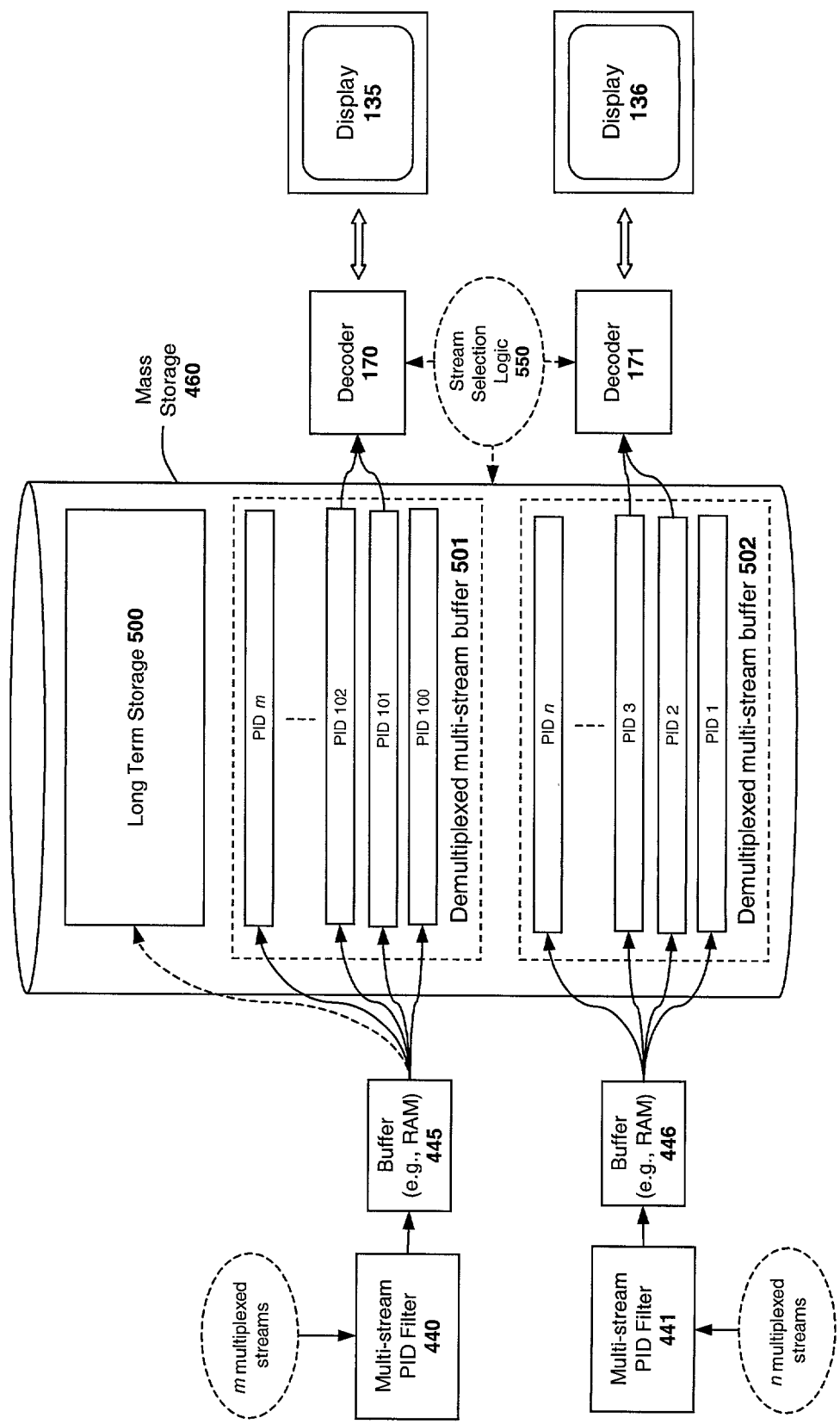
FIG. 5 illustrates more detail of an embodiment of a system for storing and processing multiple broadcast multimedia streams wherein the streams are demultiplexed before being stored.

As indicated in FIG. 5, each of the embodiments described herein may also employ a long term storage buffer 500 for recording programs specified by a user (e.g., similar to the long-term recording functionality of a VCR). In one embodiment, if a user selects a program for recording while the program is already in progress, the program content already stored in one of the demultiplexed multi-stream buffers will be transferred to the long term storage buffer 500 as well as any new program content. Alternatively, or in addition, the program content may simply be reclassified as long term storage content by changing the classification of its directory entry on the storage device rather than moving the content itself.

One benefit of separating the streams before storing them in the foregoing manner is that, in one embodiment, a user will be able to watch any program currently being broadcast from the beginning (i.e., the system will record back on each channel to the last complete program). Thus, as illustrated in the program guide 500 of FIG. 7, at 11:15 a user may watch program N on HBO Signature (PIDs 31–35 in the example) from the beginning even though the program started at 8:30. Similarly, the user may watch each of programs B, D, F, G, J and F from start to finish.

In one embodiment, a user may configure different buffer sizes for different channels. For example, a user who regularly watches a number of shows on HBO may decide to establish a large (e.g., 6 hour) buffer for that channel (e.g., by programming the system using a remote control, mouse or other cursor control device), whereas the same user may configure smaller buffers for channels which the user does not watch regularly (e.g., CSPAN). In one embodiment, the system will actively monitor the user's preferences and set larger buffer sizes based on which channels the user views the most frequently and/or the times/days during which the user views the channels. Various other buffer configuration schemes may be employed while still complying with the underlying principles of the invention.

It should be noted that various system functions described herein (e.g., the selection logic 350, 450, 550 used to select a particular multimedia stream; the PID filtering; the buffer settings; . . . etc) may be embodied in software executed by the CPU 125. Alternatively, or in addition, these functions may be embodied in any combination of hardware (e.g., an application-specific integrated circuit ("ASIC")), software and/or firmware while still complying with the underlying principles of the invention.

Figure 8:
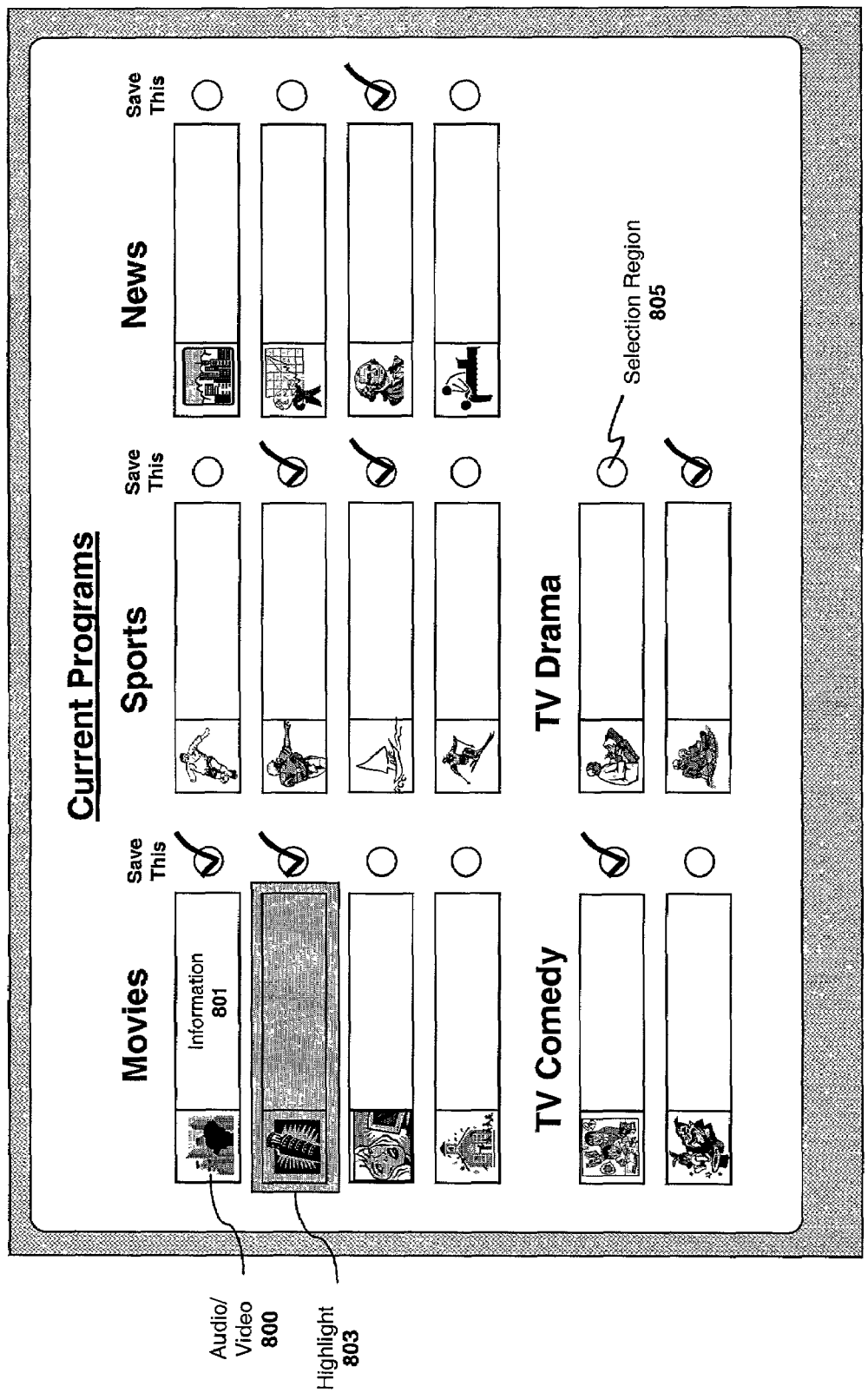
FIG. 8 illustrates a graphical user interface for selecting programs from a program guide and/or acquiring additional program-related information according to one embodiment of the invention.

Using the improved buffering techniques described above, one embodiment of the invention provides users with a listing of all currently available programs from which they may select (e.g., those programs which may be viewed in their entirety). As illustrated in FIG. 8, one embodiment of the program listing is provided in the form of an interactive graphical user interface ("GUI"). The user may select a particular program listing by moving a highlight bar 803 through the listings using a cursor control device such as a remote control, keyboard or mouse. When the highlight bar 803 is highlighting the program entry which the user wishes to view, the user may select the program entry by clicking the enter key on the keyboard/remote or the select button on a mouse.

Each program entry in the particular embodiment illustrated in FIG. 8 includes a video portion 800 and an informational portion 801. The video portion in one embodiment is a thumbnail of the actual video content provided over the cable/satellite channel. For example, if the first entry in the program list shown in FIG. 8 is HBO, then the video portion 800 of the entry will contain actual HBO video content. As a user moves through the various program entries, in one embodiment, the audio associated with that entry will also be generated. Moreover, in one embodiment, the system will display various types of user-specified broadcast content including, for example, live content (i.e., the program as it is currently being broadcast by HBO), recorded content (e.g., the first few minutes of the movie), or previews of the program (e.g., movie trailers). The underlying principles of the invention remain the same regardless of the type of content transmitted to the video portion 800 of the program entry.

Rendering audio/video content from each of the cable/satellite channels is simplified using embodiments of the present invention because the full set of multiplexed streams/channels are transmitted to the mass storage device and are accessible by the decoder modules 170, 171. Such a configuration was not possible in prior systems which only transmit one or two de-multiplexed streams to the mass storage device and decoder modules.

In one embodiment, a selection region 805 will be provided for each program entry. If a user decides that he/she would like the program entry associated with the selection region 805 to be saved, the user may simply place a check mark (or other mark) in the selection region corresponding to that entry using a remote control or other cursor control device. The system will then store the program in long term storage and/or reclassify the content as long term content as described herein. If the embodiment shown in FIG. 3 is employed, one embodiment of the invention will depacketize/demultiplex the selected program and save the program back to the mass storage device 360 (e.g., in either a packetized or a depacketized format). If the user does not wish to view the program immediately, this operation may be accomplished as a background task using the PID filters 340, 341 or other extraction software executed on the CPU 125.

The information portion 801 of the program entry may include various types of program-related data including, for example, the title and year of the movie (if the program is a movie), program reviews, and/or actors in the program, to name a few. In one embodiment, the program-related data includes links to additional information. For example, the links may be network addresses such as uniform resource locators ("URLs") which point to additional data stored on a network (e.g., the Internet). In response to a user selecting a URL (e.g., via a cursor control device), additional data addressed by the URL may be downloaded to the system and displayed to the user. Accordingly, this embodiment of the system is equipped with a modem or other device for providing two-way communication over the Internet or other network (e.g., the cable/satellite provider's network). Various types of modems may be employed including digital subscriber line ("DSL") modems, cable modems, and plain old telephone system ("POTS") dial up modems (i.e., depending on the particular type of communication channel used by the system). Of course, the type of modem used to support interactive communication is not pertinent to the underlying principles of the invention.

Wideband Implementations

Figure 9:
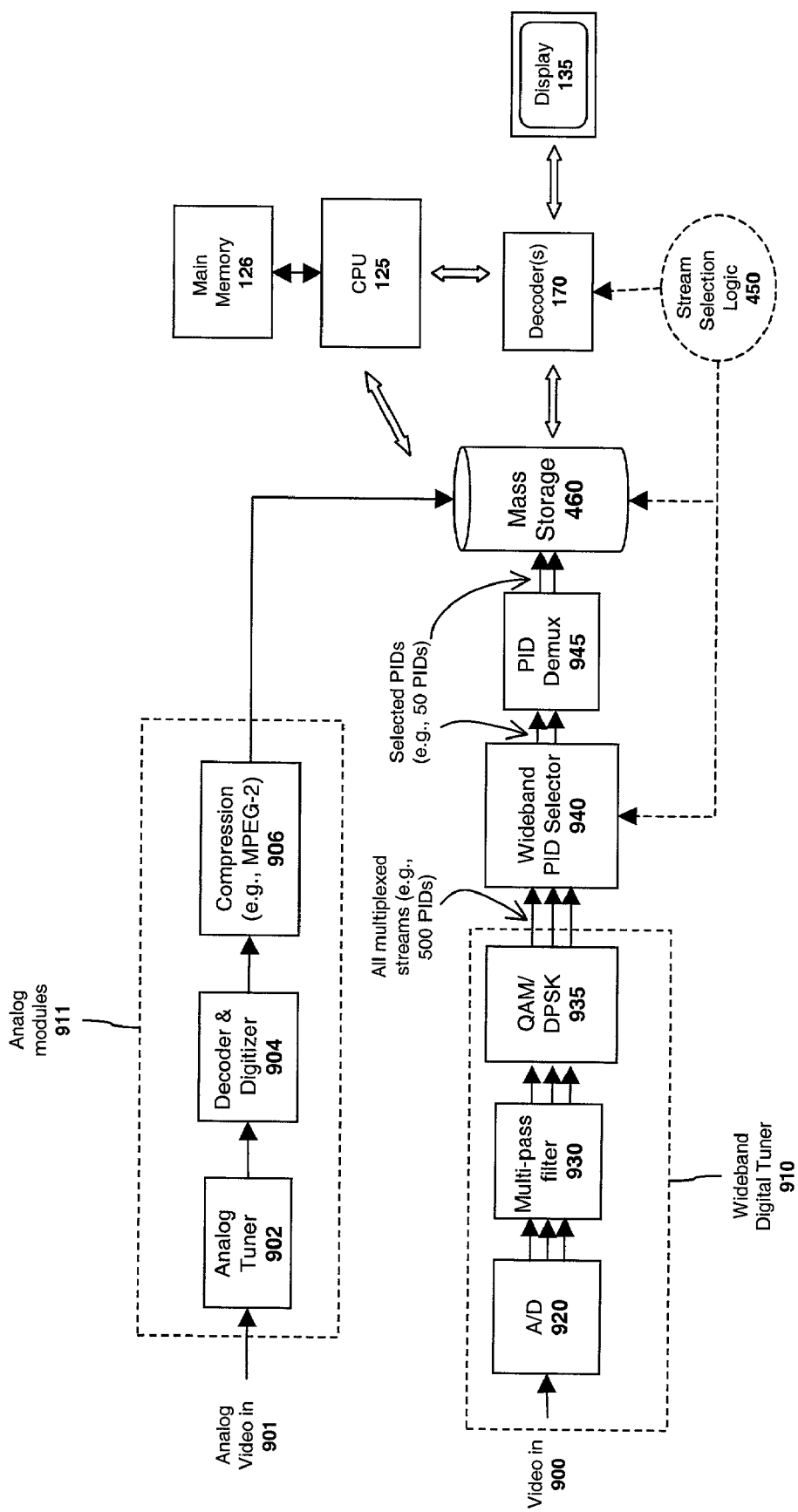
FIG. 9 illustrates a wideband implementation according to one embodiment of the invention.

In one embodiment of the invention, illustrated in FIG. 9, a wideband tuner 910 is configured in to lock on to several groups of multiplexed streams at once as opposed to just a single group. In the illustrated embodiment, the wideband tuner 910 is comprised of an analog-to-digital ("A/D") converter 920 for receiving and digitizing numerous incoming streams—potentially all streams transmitted by a particular cable/satellite provider (e.g., over a 1 GHz frequency range); a multi-pass filter 930 which divides the digitized wideband signal into a plurality of discrete frequency bands (e.g., bands of 100 MHz); and a wideband QAM/DPSK module 935 which individually demodulates the content from each of the discrete frequency bands to reproduce all of the multiplexed multimedia streams. In one embodiment, the QAM/DPSK module 935 is comprised of a series of digital signal processors ("DSPs") (e.g., one DSP per frequency band), each programmed with a QAM function for performing QAM demodulation and/or a DPSK function for performing DSPK demodulation. In addition, the DSPs may perform other functions such as signal equalization and noise filtering. In one embodiment, the DSPs operate under the control of the system's CPU 125 (e.g., the CPD executes software comprising the QAM/DPSK functions).

All of the groups of multiplexed streams (which, as indicated in FIG. 9, may include 500 or more PIDs), are transmitted through a wideband PID selector 940 which, in response to selection logic 450, selects a subset of all the multiplexed PIDs for storage on the mass storage device 460. The particular number of PIDs selected by the PID selector 940 may vary depending on the preferences of the user and/or the capabilities of the mass storage device 460 (e.g., the device's bandwidth and storage capacity). For example, in one embodiment, users may be prompted to select a set of "favorite" channels to be continually buffered on the mass storage device 460 (whereas the user's non "favorite" channels will not be buffered, or will only be buffered for a limited time period). To support the increased storage and bandwidth requirements of the several sets of additional streams, one embodiment of the invention includes one or more additional mass storage devices (e.g., connected through a multi-drive high speed communication interface such as UDMA or SCSI).

In one embodiment, a PID demultiplexer 945 demultiplexes/depacketizes the streams selected by the wideband PID selector before storing them on the mass storage device 460. Alternatively, or in addition, the streams may initially be stored in a multiplexed format on the mass storage device and the PID depacketizer 945 may extract PID packets only when a user decides to watch/record a particular program (e.g., as described above with respect to the embodiment shown in FIG. 3). Once selected by a user, the stream is then transmitted through a decoder module 170 for MPEG-2 decoding (or other type of decoding, depending on how the stream was initially encoded) and to a display 135. Although illustrated above as two separate modules, it will be appreciated that the functionality of the PID demultiplexer 945 and wideband PID selector 940 may be combined within a single module.

In one embodiment, a separate set of analog modules 911 may be included in the system to process and store legacy analog broadcasts. The analog components may include an analog tuners 902 for receiving the analog broadcast at a particular frequency, a decoder/digitizer module 904 for decoding and performing A/D conversion on the analog signal, and a compression module 906 for compressing the signal before storing it to the mass storage device 460.

In one embodiment, the digital components may be configured to provide the analog functionality just described. For example, the DSPs within the QAM/DPSK module 935 may be programmed with an NTSC or PAL demodulation function for demodulating the incoming analog signal 901 (i.e., after the signal is digitized via the A/D converter).

Conditional Access Embodiments

In order to prevent users from viewing multimedia content which they do not have the right to view (e.g., subscription based channels, pay-per-view channels, . . . etc) the multimedia content is frequently encrypted using a series of encryption keys before being transmitted. Accordingly, multimedia systems are generally equipped with conditional access ("CA") subsystems for decrypting the incoming multimedia content.

Figure 10:
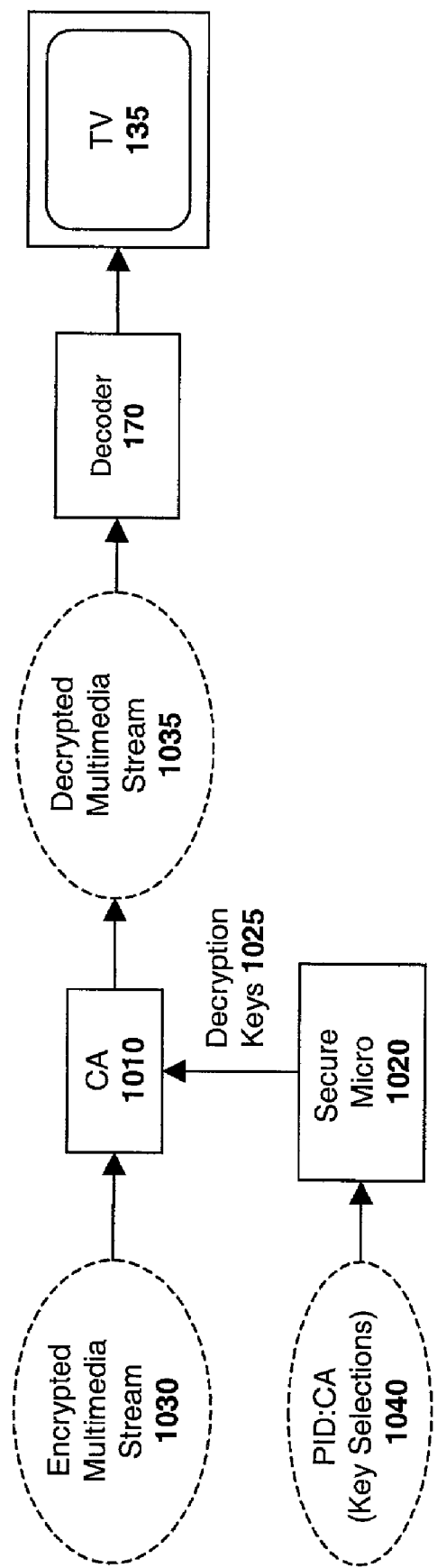
FIG. 10 illustrates operation of a conditional access module and a secure micro unit.

FIG. 10 illustrates a CA module 1010 decrypting an incoming multimedia stream 1030 to produce a decrypted multimedia stream 1035, which is then decoded by decoder 170 (e.g., using an MPEG-2 decoder) and rendered on a television display 135. The decryption keys 1025 used to decrypt the multimedia content are transmitted to the CA module 1010 from a secure micro unit 1020. Because the keys used to encrypt the multimedia stream typically change every few seconds, these key changes must be synchronized at the secure micro 1020 and CA modules 1010. Accordingly a key selection data stream 1040 (also referred to herein as the "PID:CA" stream or "conditional access data") is provided to the secure micro unit 1020 so that it knows precisely which key to transmit to the CA module 1010 at a given point in time.

As a result of the CA subsystem, if the incoming multimedia stream is stored in an encrypted format on a mass storage device, the decryption key changes associated with that multimedia stream must also be stored (i.e., so that when a user selects the stream, the secure micro will provide CA module with the decryption keys required to decrypt the stream). Prior systems deal with this problem simply by decrypting the multimedia stream before it is stored. However, storing decrypted content on a long term storage device in this manner leaves the copyright holder of the content exposed to unauthorized copying. In addition, because CA subsystems are typically only capable of decrypting one stream at a time, this configuration only provides for storage of only a single stream per CA module.

Figure 11:
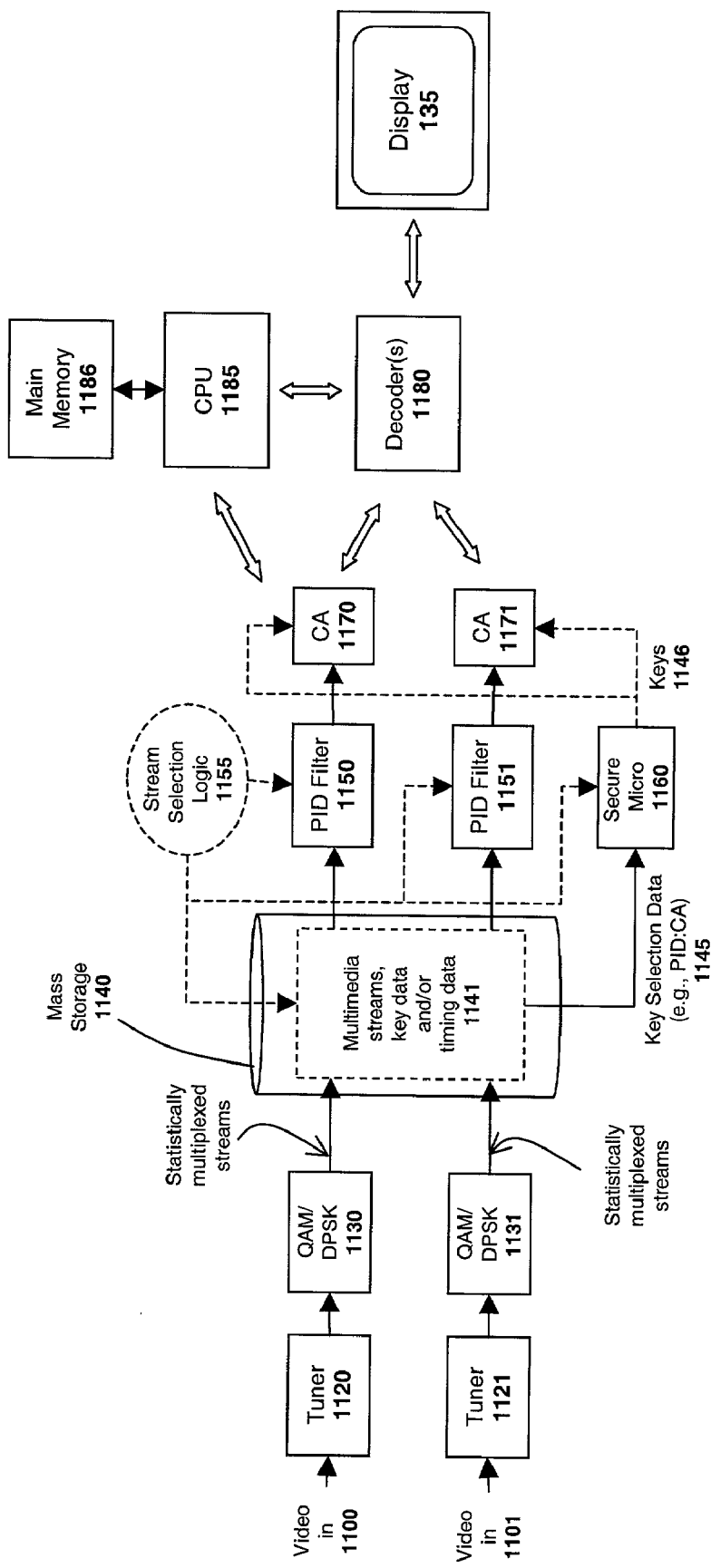
FIG. 11 illustrates a system for processing multiple multimedia streams and associated conditional access data.

One embodiment of a system for concurrently processing decryption keys for multiple streams is illustrated in FIG. 11. Like prior embodiments, this embodiment includes one or more tuners 1020, 1021 for locking on to multimedia stream within a specified carrier frequency and one or more QAM and/or DPSK demodulators 1030, 1031 for demodulating the multimedia stream.

Unlike prior systems, however, the illustrated embodiment stores the PID:CA key selection data 1145 identifying the keys 1146 to be supplied by the secure micro 1160 to the CA modules 1170, 1171 for each multimedia stream, as well as timing data indicating the points in time at which each portion of the multimedia stream and associated key selection data 1145 were received/stored on the system (or alternatively, the points in time at which the stream/content was transmitted). When a user subsequently chooses a particular multimedia stream for playback, the secure micro 1160 uses the key selection data PID:CA 1145 for that stream to provide the correct series of keys to the CA modules 1170, 1171 for decryption of the selected stream. As in the embodiments described above, the user may be able to watch any program stored on the mass storage device for a predetermined buffer period or from the beginning (e.g., as described above with respect to FIGS. 6 and 7, respectively). In one embodiment, stream selection logic 1155 (embodied in hardware or software executed by the CPU 1185) will select the correct multimedia stream and PID:CA stream at the correct point in time (e.g., using techniques described in greater detail below) responsive to the user's selection (e.g., via a remote control or a cursor control device). Once the multimedia stream is decrypted by one of the CA modules 1170, 1171, one or more decoder modules 1180 then decode the stream using an appropriate codec (e.g., MPEG-2) and transmit the decoded stream to a display 135.

Figure 12:
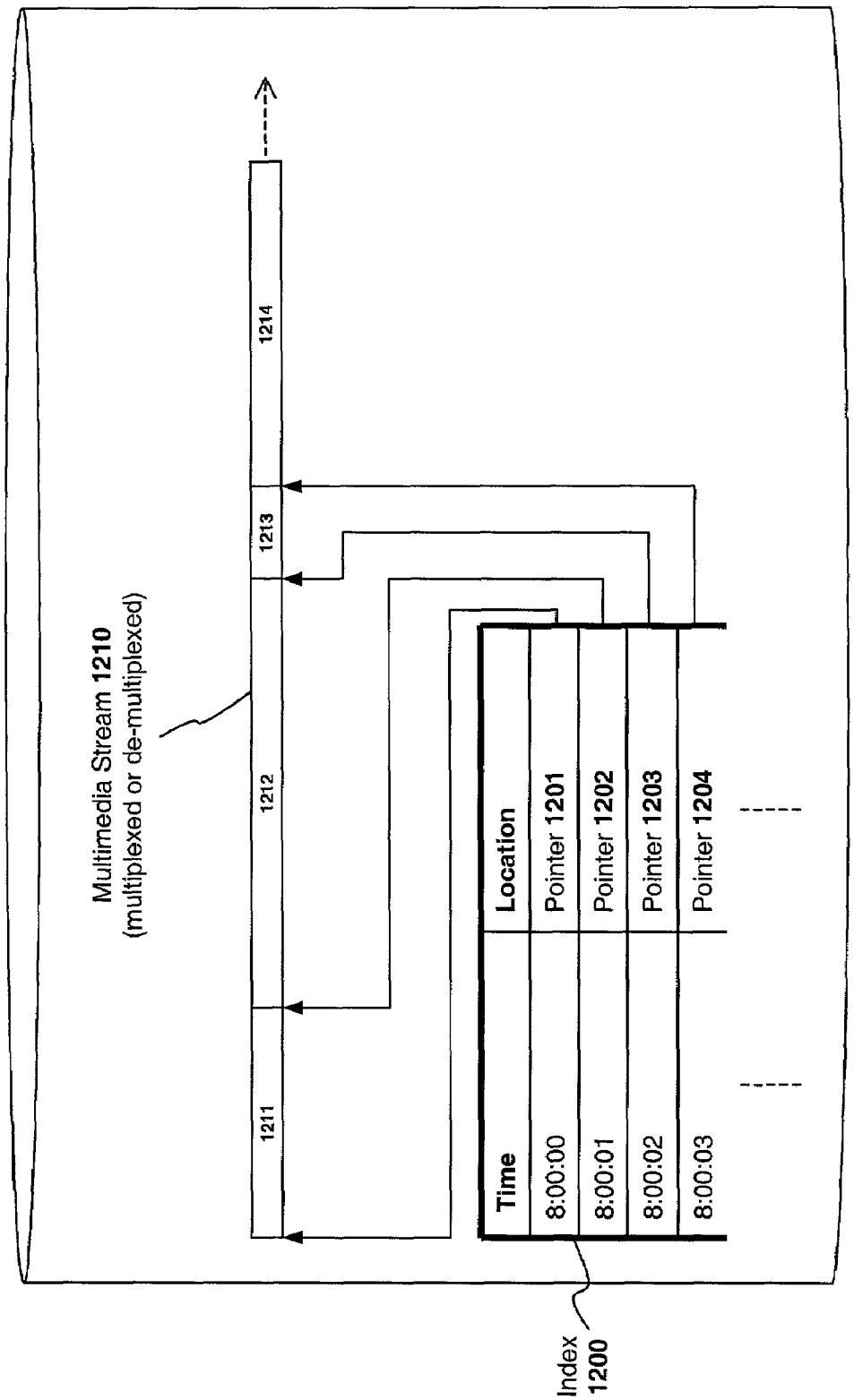
FIG. 12 illustrates a timestamp index employed in one embodiment of the invention.

Identifying the correct points in time within the multimedia stream to begin playback is complicated by the fact that MPEG-2 data (as well as other types of encoded multimedia content) is not typically received by the system at a steady rate. For example, a portion of an MPEG-2 stream which contains significant movement between each of the image frames (e.g., a video of an explosion) will typically consume significantly more bandwidth than a portion of an MPEG2 stream that contains little or no movement. Thus, as illustrated in FIG. 12, four 1-second portions (1211, 1212, 1213, 1214) of the incoming multimedia stream 1210 may occupy different amounts of space on the mass storage device. As such, in one embodiment of the system, an index of timing data 1200 is provided so that the stream selection logic 1155 can accurately locate where on the hard drive to start decrypting/rendering the multimedia stream in response to a user request to play back a particular program. Included within the index 1200 is a series of address pointers 1201–1204, each associated with a timestamp (labeled 8:00:00 through 8:00:03). In operation, if a user selects a stored program which started at 8:00, for example, the stream selection logic 1155 will identify the 8:00:00 timestamp within the index 1200 and will start decrypting/playing the program stream back from the address identified by pointer 1201.

In one embodiment, the stream selection logic 1155 will also identify the appropriate point within the PID:CA stream from which to read the necessary key changes. In one embodiment, a separate set of pointers to the PID:CA stream may be included within the timestamp index 1200 or, alternatively, within a separate PID:CA index (not shown). Alternatively, the conditional access data PID:CA may be stored directly within the index 1200. However, in an embodiment in which the PID:CA stream is not encrypted and/or is transmitted at a steady rate (e.g., 0.1 Mbit/sec), address pointer entries to the PID:CA stream may not be required (i.e., the selection logic will be able to accurately identify where to read from the PID:CA stream without the need for an index).

In one embodiment, the timing index 1200 is transmitted along with the multiplexed multimedia streams in the form of an additional PID stream (e.g., a PID:INDEX stream transmitted from the head-end or uplink satellite that feeds the head-end). In other words, in this embodiment, the organization providing the source material (e.g., the cable or satellite provider) will generate and transmit the index to the end user's system.

However, if the content provider does not transmit the index, one embodiment of the system will construct the index 1200 as the multimedia streams are received and written to the mass storage device. For example, index/timestamp generation logic executed by the CPU 1185 (or embodied in hardware) may be configured to generate a new timestamp entry every 1/100 of a second and continuously store the results to the mass storage device 1140. However, it should be noted that the particular frequency with which timestamp entries are generated is not pertinent to the underlying principles of the invention.

Figure 13:
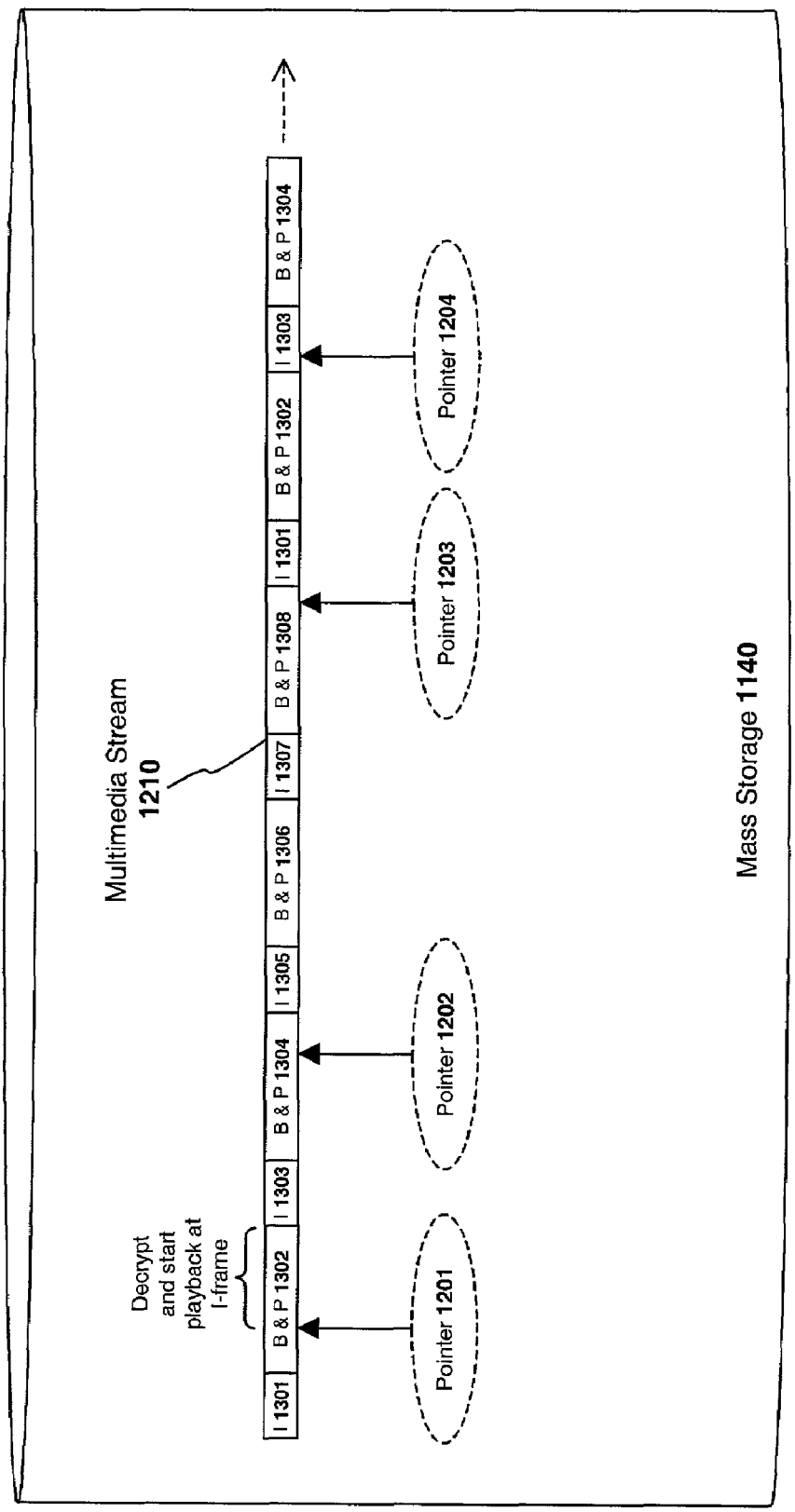
FIG. 13 illustrates techniques for identifying I-frames within a multimedia stream.

As illustrated in FIG. 13, an MPEG-2 stream 1310 is comprised of a series of I-frames separated by B-frames and P-frames. MPEG-2 uses similar DCT-based intraframe coding as the JPEG standard for each of the I-frames, but compresses the intervening video content by encoding only the differences between periodic I-frames within the B-frames and P-frames. Accordingly, it would be preferable if the pointers 1201–1204 contained in the timestamp index 1200 pointed to I-frames within the MPEG-2 stream rather than B or P frames (i.e., because the B and P frames are meaningless outside of the context of the two I-frames they connect). Accordingly, if the timestamp index is generated by the organization providing the source material, each of the pointers 1201–1204 should be selected to point to I-frames within the MPEG-2 stream.

If, however, the timestamp index 1200 is generated by the system, as described above, then the pointers 1201–1204 may not necessarily point to an I-frame. Accordingly, in one embodiment of the invention, if a stream is played back from an address pointer which does not point to an I-frame (e.g., such as pointer 1201 in FIG. 13) then it will decrypt/decode the stream up until it reaches an I-frame and will begin playback from that point. For example, in FIG. 13, the system will begin decrypting the stream at the point identified by pointer 1201 (in the middle of B & P frames 1302) but playback would not start until the decryption process reached I-frame 1303. In one embodiment, the system identifies the I-frame 1303 by decrypting its I-frame header.

Similar techniques may also be employed to allow users to fast-forward through the multimedia content. More specifically, in response to a fast forward command, one embodiment of the system will display a series of I-frames in succession. Depending on the speed at which the fast forward is set to, this embodiment may jump several I-frames at once (as described in greater detail below). If the timestamp index described above contains pointers which point directly I-frames, then the I-frames will be identified directly via the index.

Figure 14:
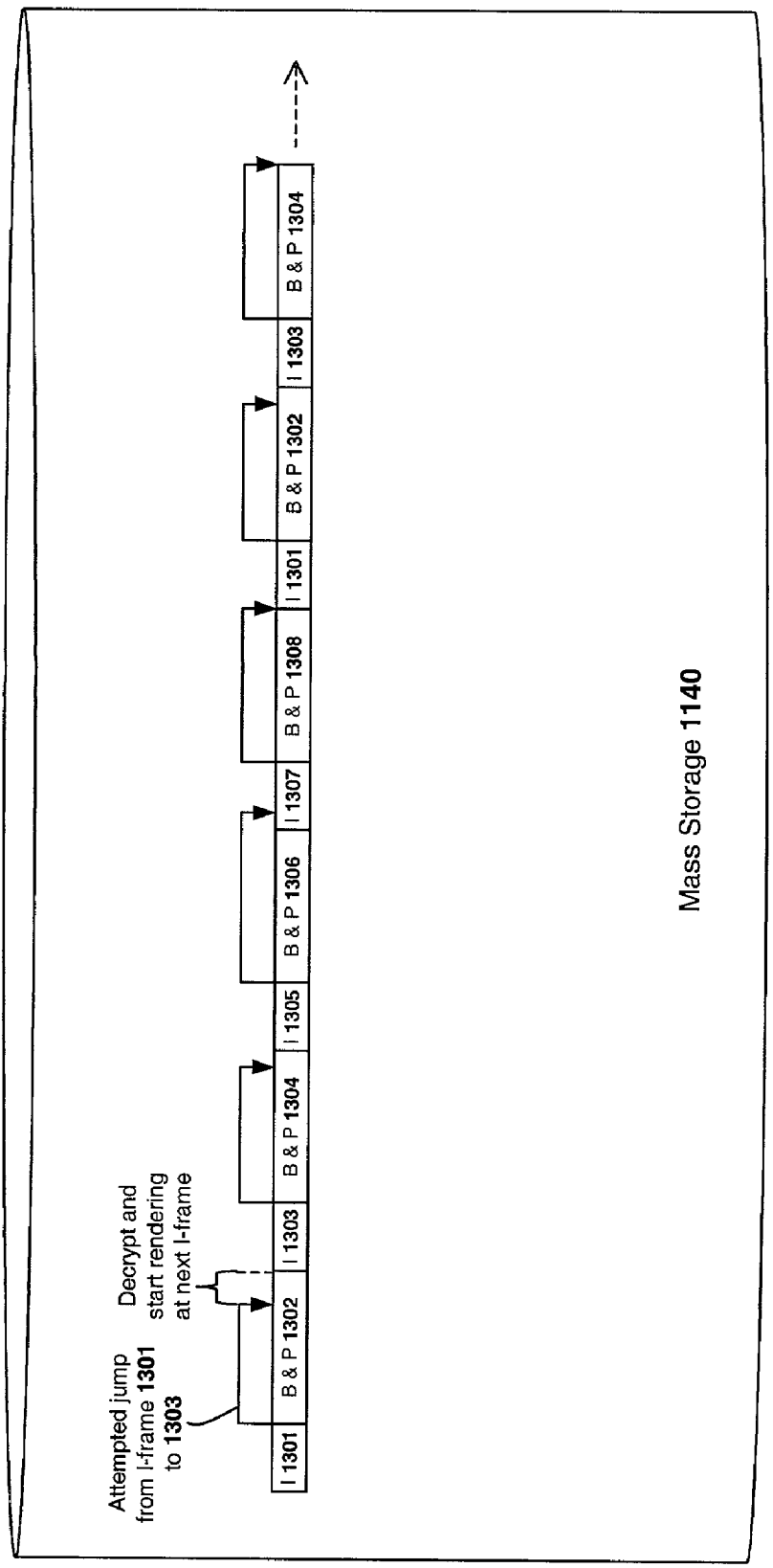
FIG. 14 illustrates operation of a fast forward function according to one embodiment of the invention.

If, however, the index is constructed as the multimedia stream is received, then jumping from one I-frame to the next may not be entirely accurate because the number of B and P frames between each I-frame and the data contained within each B and P frame is not consistent. Accordingly, as illustrated in FIG. 14, when a user selects fast forward, one embodiment of the system will estimate the jump from the current I-frame 1301 to the next I-frame 1303 based on the speed of fast forward request and/or the estimated time between each I-frame. In one embodiment, the system will perform a lookup in the timestamp index 1200 to make the jump. Alternatively, or in addition, the jump may be based on the assumption that during standard playback, a new I-frame is decided approximately every ½ second. The underlying principles of the invention remain the same regardless of how the jump to the next I-frame is estimated.

Regardless of how the jump is estimated, once it occurs, one embodiment will then begin decrypting the stream using the decryption key data PID:CA 1145 associated with that point in time, until the decryption process reaches the desired I-frame 1303. Once the I-frame 1303 is reached, it is decrypted, decoded and rendered on the display. The same techniques may then be employed for the estimated jump to the next I-frame 1305. The system may identify each of the I-frames by decrypting their respective I-frame headers.

If one embodiment, if the jump lands in the middle of the next I-frame as illustrated in FIG. 14 (as the jump from I-frame 1305 to 1307, then one embodiment of the invention will decrypt the stream backwards until it reaches the beginning of I-frame 1307. The system may identify the middle of an I-frame by the presence of I-frame data rather than B or P frame data (e.g., DCT intra-frame data rather than inter-frame motion data).

If the speed of the fast forward request is set high enough the secure micro unit 1160 may be required to provide a new decryption key with each jump. Accordingly, one problem which may result is that the secure micro 1 160 may not be capable of providing decryption keys to the CA module 1170 quickly enough (e.g., the secure micro may only be capable of supplying a new key every ⅓ second). If this is the case, then one embodiment of the invention will continue to display the current I-frame until a new key can be generated as it jumps over several I-frames at a time. In this manner, decryption will take place as quickly as the secure micro unit 1160 can generate new keys.

As the multimedia stream is decrypted during playback, one embodiment of the invention will store the decrypted stream back to the mass storage device 1140, thereby replacing the encrypted multimedia data. At this time an I-frame index can be written to the storage device 1140 as well. Accordingly, if a user subsequently decides to rewind to a particular point within the multimedia stream, or decides to watch the program a second time, the foregoing I-frame identification techniques may no longer be required (i.e., because the stream will have been decrypted and an I-frame index may be available). In addition, in one embodiment, as soon as the user begins watching a particular multimedia stream, the system will run ahead of stream playback, decrypting the stream as quickly as it can (generally dictated by how quickly the secure micro unit 1160 can supply keys) and storing the decrypted stream back to the mass storage device. Using this technique an entire movie may be completely decrypted during the first several minutes of playback. Accordingly, if the user subsequently chooses to fast-forward through the movie, the I-frame identification techniques described above will not be required.

In one embodiment, any multimedia programs which the user designates for long term storage (e.g., by checking the selection region 805 corresponding to the program as illustrated in FIG. 8), will be decrypted in the background by software executed on the CPU 1185 and/or using dedicated decryption hardware. This embodiment may be required in cases where the decryption keys provided by the cable/satellite provider expire after a predetermined period of time (i.e., and therefore could not be used to decrypt the multimedia programs after a predetermined time has elapsed).

In order to protect the copyright holders' rights in the multimedia content stored on the mass storage device 1140, one embodiment of the invention will employ additional encryption techniques once the multimedia content has been decrypted. For example, one embodiment of the system delivers a unique key to the mass storage device 1140 as soon as the system is powered up. This technique is available today on many current Ultra-ATA hard drives. If the wrong key is transmitted a predetermined number of times, the hard drive will render the data stored thereon inaccessible (e.g., in one embodiment the hard drive will format itself). Accordingly, an individual who steals the mass storage device 1140 will be unable to access the multimedia content.

In addition, in one embodiment, after the multimedia content is decrypted using keys supplied by the secure micro 1160, one embodiment will re-encrypt the content using one or more known encryption algorithms. For example, in one embodiment, Data Encryption Standard ("DES") encryption will be applied to the multimedia content before storing it back to the mass storage device 1141. As is known in the art, DES is a NIST-standard secret key cryptography method that uses a 56-bit key. It will be appreciated, however, that various other encryption algorithms may be employed while still complying with the underlying principles of the invention. However, one benefit of using DES encryption is that many MPEG-2 decoder chips have the DES encryption function built in (e.g., such as the AViA-9600 from C-Cube Microsystems, Inc). As such, if the system is equipped with an MPEG-2 decoder, no additional hardware will be required, thereby reducing system costs.

Figure 15:
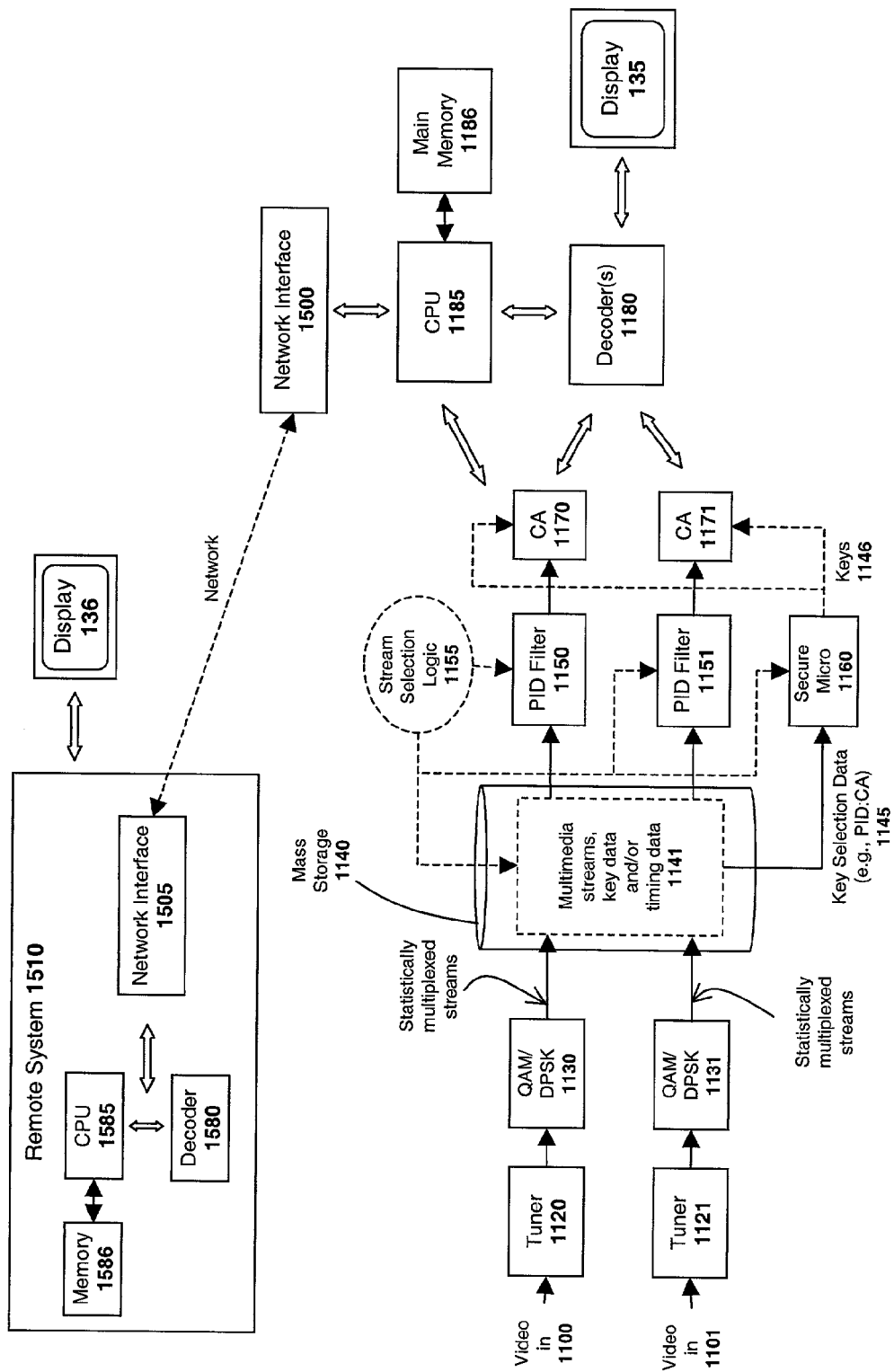
FIG. 15 illustrates an embodiment witch includes one or more remote nodes for processing multimedia content.

In one embodiment, illustrated in FIG. 15, a network interface 1500 is configured in the system to provide communication to a remote multimedia node 1510 (also equipped with a network interface 1505). Various different networking protocols/standards, both wired (e.g., Ethernet) and wireless (e.g., 802.11b), be employed to support the communication between the various nodes.

The format in which multimedia content is transmitted to the multimedia node 1510 may depend on the node's capabilities. For example, in one embodiment, the node 1510 is equipped with its own conditional access module and secure micro unit (not shown). Accordingly, in this embodiment, multimedia streams requested by the remote node 1510 may be transmitted in an encrypted format along with the associated key selection data PID:CA. By contrast, in one embodiment the remote node 1510 may not be equipped with conditional access functionality. As such, in this embodiment, the multimedia content will be decrypted before being transmitted. In order to protect unauthorized access to the multimedia content (e.g., by an unauthorized user listening on the network), one embodiment will re-encrypt the stream before transmitting it to the remote node 1510 using an encryption format which the remote node can employ in real time (e.g., DES encryption). Various other techniques may be used to provide secure communication with the remote node 1510 while still complying with the underlying principles of the invention (e.g., communication may be encrypted using Secure Sockets Layer ("SSL") encryption).

EMBODIMENTS OF A SYSTEM AND METHOD FOR EFFICIENTLY STORING AND PROCESSING MULTIMEDIA CONTENT

As described briefly above, a reasonably complex set of data-flows may be required to concurrently process multiple data streams. For example, in one embodiment, the multiplexed streams are initially written to system memory via direct memory access ("DMA"). The CPU then demultiplexes the multiplexed streams into their constituent programs. At this point, in order to conserve space/bandwidth, portions of each stream may be discarded, either because they are completely useless, or because the user-preferences module says certain shows are not required (e.g., the streams may be repeats of already-recorded shows, or may be a high-definition simulcast on a system which does not have a high-definition display . . . etc).

The show as extracted from the multiplexed streams may be subject to Conditional Access ("CA"), and therefore encrypted. These streams may be processed using various CA embodiments described above. The CA-processed show is then MPEG decoded (if necessary), or transmitted over the a local network to a remote system capable of decoding the MPEG audio and video (referred to as "AV Extension," or "AVX" in this document). As mentioned above, the video may be transmitted in the form of DES-encrypted MPEG2.

Disk Performance Characteristics

One critical bottleneck in the process of reading and writing multimedia content is the performance of the storage device. There are at least three important parameters of disk performance: the disk interface (e.g., IDE, SCSI, . . . etc) transfer rate; the disk transfer rate; and the block access time.

As mentioned above, one embodiment of the invention employs an IDE interface. However, it should be noted that the underlying principles of the invention are not limited to any particular interface type. Common IDE interface modes are ATA-33, ATA-66 and ATA-100, with a theoretical peak transfer rate of 33, 66, and 100 Mbytes/sec respectively. IDE transfer speed is rarely a source of IO bottlenecks.

Disk transfer rate is a function of the bit density on the surface of the disk, and the rate the head moves over the bits. Disks typically employ a variable bits-per-track density in order to keep the media bit density constant over the surface of the disk. As a result, the transfer speed at the outer edge of the disk is higher than the inner one.

The block access time is the time for the head to reach a particular block to begin reading/writing data. It is a product of at least two factors: the head seek time, and the rotational latency. Head seek time is (approximately) linearly proportional to seek distance. Rotational latency is the time it takes for the data block to rotate under the head once the head is on the right cylinder; it is therefore proportional to the disk rotation speed (e.g., 5400 RPM, 7200 RPM, . . . etc).

As a result, rotational latency is the most important factor for short seeks, since the head itself can seek in 3–4 mS, but may need to wait another 8 mS for the correct block to arrive.

I/O Algorithms

The disk performance characteristics described above may be analyzed to determine the best way to organize disk input/output ("I/O"). There are a few general observations which can be made: large I/O operations to a set of contiguous disk "blocks" are the most efficient way of using the disk; random access around the disk is very expensive in terms of performance, even when the seek distance is short; transfer rate varies by about 30% across the surface of the disk; and the aggregate rate of all streams stored by the system is limited by the bit-rate of the signal transmitted from the satellite/cable head-end.

In one embodiment of the invention, the transport stream (i.e., the set of multiplexed streams) will be written to disk exactly once, and read at most once. A significant proportion may never be read at all. This suggests that it may be best to optimize certain portions of the storage system for writing rather than for reading.

As described above there are at least two approaches for processing incoming data: (1) save the entire transport stream into one big file, then split it into shows at a later stage, (2) split it into shows and save it as one file per show.

The first option has the apparent advantage of allowing the file system to lay blocks out on disk with maximum efficiency, since it simply has to write a single large file. Assuming the free space is relatively unfragmented, this will work well. However, managing free space under this approach may become difficult. Since a full 2-transponder setup may generate up to 20–30 Gbytes/hour, it may often be necessary to delete unwanted shows as efficiently as possible, in order not to completely fill up the disk. This is a difficult task if the shows are multiplexed into a single file.

Under the second approach, multiple files may be written out in parallel (e.g., one file per show). This may become problematic; each show uses a different encoding bitrate, so each file will grow at a different rate. Since the file system will try to optimize each file, it may cause the disk to seek between the tails of each growing file.

In either case, fragmentation may be an issue. If the disk is completely empty, the file system will have total freedom to lay out files. Unfortunately, this situation will not generally last long. After files have been created with their blocks intermingled and deleted, the file system free space may become quite fragmented.

Fragmentation can be mitigated by ensuring that it happens in sufficiently large blocks that the aggregate transfer rate is maintained despite access latency. This may be accomplished by buffering streams in memory until there is a large enough chunk to write to make it worth the cost of a seek to start writing.

Figure 16:
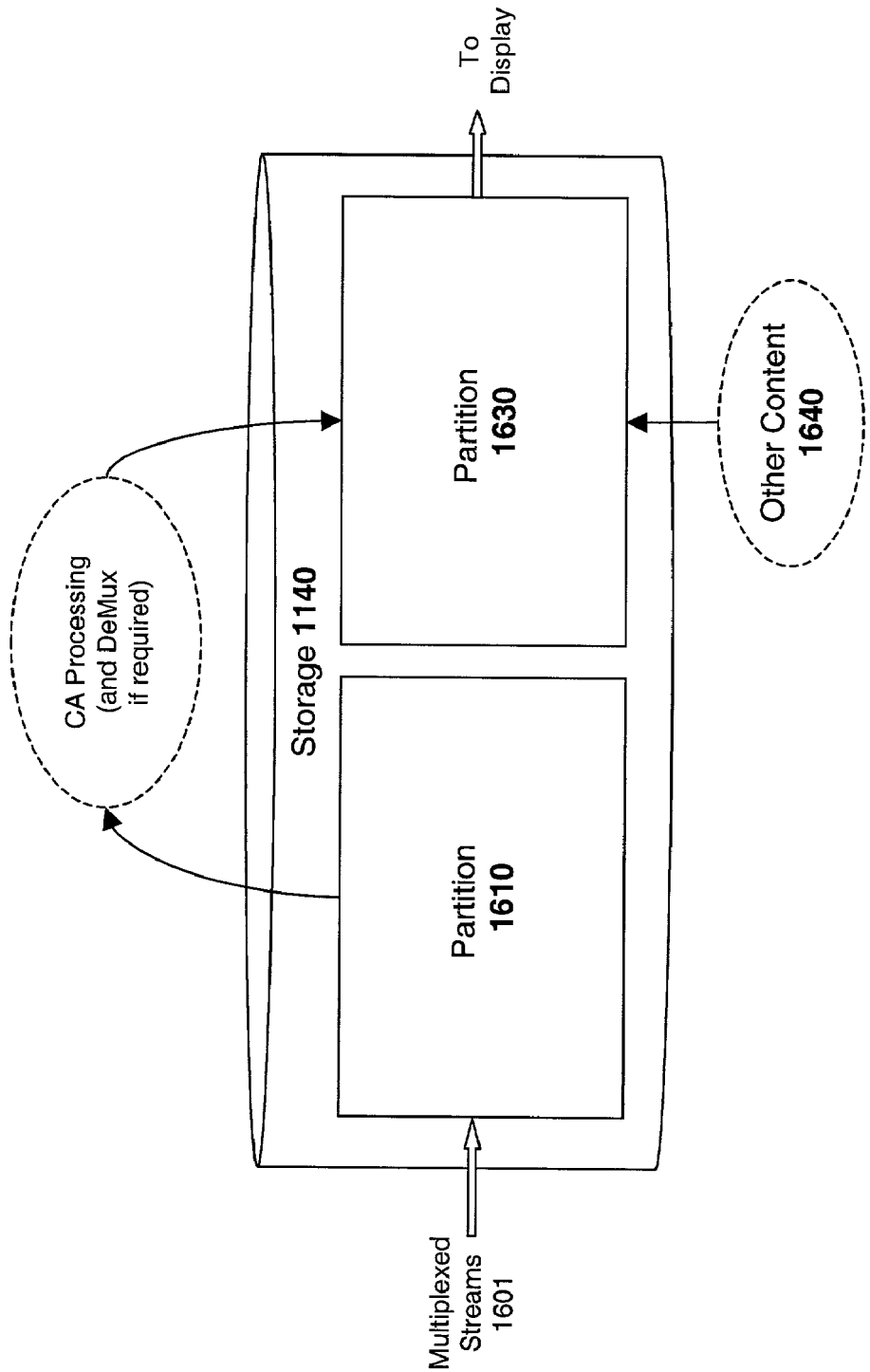
FIG. 16 illustrates an embodiment with two or more disk partitions.

In one embodiment, illustrated in FIG. 16, two or more disk partitions 1610 and 1630 are created to store the incoming transport streams 1601 at different stages of processing. Files resulting from the transport streams 1601 will initially be stored in one partition 1610. In one embodiment, these files will be short lived. They may either be deleted almost immediately, or may be processed through the CA system and then deleted. Once decrypted via the CA system (and demultiplexed if the files were initially stored in a multiplexed format), the programs are written to the second partition 1630, the main media partition, where they may persist for some time, and be read multiple times.

Accordingly, in this embodiment, the partition 1610 for initially storing the transport stream is optimized for writing. For example, in one embodiment, to ensure that the high-bandwidth I/O of the full transport stream 1601 is maintained, this partition 1610 is located at the outer edge of the disk (i.e., to take advantage of the higher disk transfer rate at the outer edge). Moreover, because this partition 1610 is logically separated from the main media partition 1630, any fragmentation which may result from continuously reading/writing the transport stream 1601 will be isolated to the first partition 1610, thereby improving the playback performance of the second partition 1630.

Various types of information may be filtered out when the content from the first partition 1610 is decrypted and stored on the second partition 1630. For example, if the user does not own a high-definition television ("HDTV"), any HDTV content may be thrown out. Similarly, if a particular show is already stored on the second partition, it may be discarded to avoid redundancy. The user may also identify a subset of channels which he/she does not want stored in the second partition 1630. For example, if the user only speaks English, he/she may decide to filter out channels broadcast in other languages. One particular embodiment of the system will monitor the user's viewing patterns and will filter shows based on those preferences. Various other types of content may be filtered out while still complying with the underlying principles of the invention (e.g., closed-captioning content, Dolby Digital® surround sound data, . . . etc).

As indicated in FIG. 16, the user may store various other types of content 1640 on the second partition 1630. For example, in one embodiment, the user may store his compact disk collection (e.g., as a series of MP3 files), home video collection, or any other audio/video content designated for long term storage.

Although illustrated in FIG. 16 as two partitions on a single hard drive, it should be noted that two separate hard drives may also be configured in the system to perform the same functions as the two partitions 1610, 1630. For example, files read from the transport streams 1601 may initially be stored on one hard drive optimized for writing before being transferred to a second hard drive optimized for reading.

I/O Contention

Many other parts of the system software may also require disk access. These fall generally into two classes: streaming and non-streaming. Streaming disk use, such as MPEG playback, CD-ripping (copying CDs to the system), MP3 encode/decode, etc, can be arbitrated by the middleware that manages the resources for streaming media, referred to herein as the Media Routing Architecture or "MRA." The MRA may need to apply bandwidth throttling policies to certain streams in order to meet its more time-critical commitments. For example, in one embodiment, the MRA employs the techniques disclosed in co-pending application entitled "SYSTEM AND METHOD FOR INTELLIGENT BUFFERING AND BANDWIDTH ALLOCATION" (Ser. No. 09/654,317) which is assigned to the assignee of the present application and which is incorporated herein by reference.

Non-streaming disk use is characterized by small bursts of I/O scattered around the file system. These include, for example, processes demand-loading pages from their executables; database lookups and updates (e.g., by the electronic program guide ("EPG") database); CD/DVD Jukebox database updates; and the deletion of large files, to name a few. The risk is not so much that non-streaming I/O will consume too much bandwidth, but rather that it may increase disk seeking and therefore cause streaming I/O to miss its time deadlines.

Various techniques may be employed, alone or in combination, to mitigate this risk:

One solution is to ensure that there is sufficient buffer memory to coalesce the small I/O bursts into larger bursts, more akin to streaming.

Paging may be minimized by ensuring that most processes are started at boot time, and quickly collect all their working set pages into memory. This reduces the amount of paging while the system is running.

Database updates, such as the EPG and the Music Jukebox, can be kept to a slow rate. This type of discipline may be built into the database engine itself. For example, if the database manager restricts itself to a relatively low rate of I/O requests, then they may be scheduled among the streaming requests.

Database reads may be harder to manage than database updates, since a timely response will be necessary to provide adequate feedback to the user. Accordingly, in one embodiment, the bitrate throttling controlled by the MRA should be directly sensitive to current system activity rather than throttling everything to a "safe" level.

Typically, a file system will generate a significant amount of heavy seeking when deleting a large file, potentially degrading the overall file system performance. Accordingly, in one embodiment, steps may be taken to ensure that deleting large media files does not generate an unreasonable amount of seeking. These feature will be addressed in greater detail below.

Kernel and File System Behavior

Figure 17:
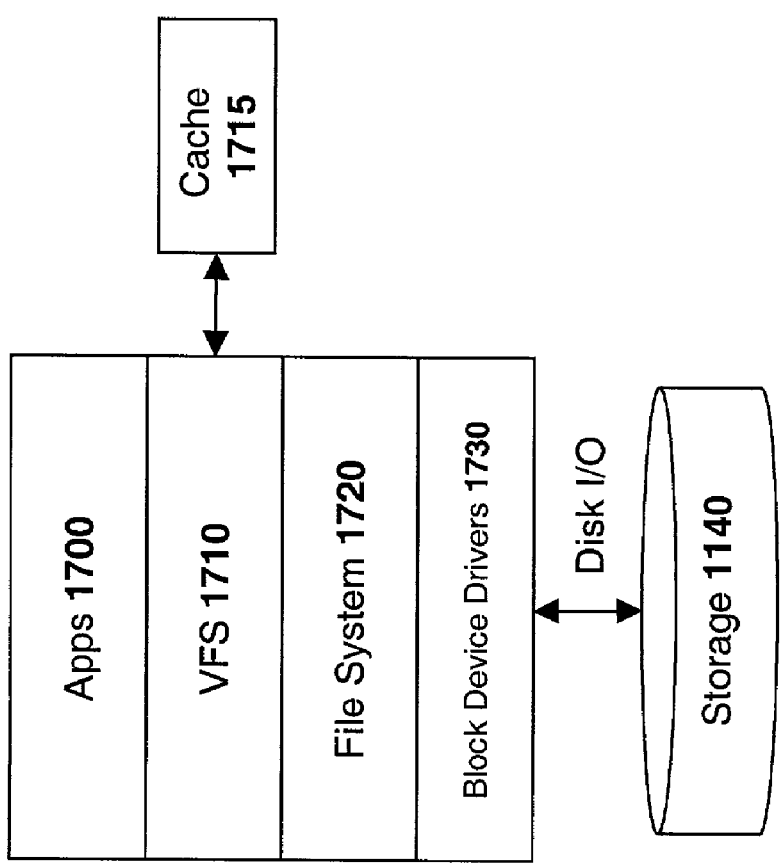
FIG. 17 illustrates an architecture according to one embodiment of the invention.

In one particular embodiment, illustrated in FIG. 17, there are three relevant kernel systems: the Virtual File Switch ("VFS"), 1710 the file system 1720 and the block device drivers 1730. These systems are based on Linux 2.4. However, it should be noted that the underlying principles of the invention may be implemented using virtually any operating system (e.g., Windows NT).

The VFS 1710 is responsible for maintaining the in-memory cache 1715, and also for scheduling when dirty buffers should be written to disk. By default many operating systems will delay writing files to disk for as long as possible, in case the file is rewritten multiple times, or even deleted before it gets to disk. Under heavy write loads, this can lead to large numbers of dirty pages accumulating in memory, resulting in undesirable burstiness in writes. As memory fills with dirty disk cache pages, the VFS decides to write them all out at once, which may delay future writes. To solve this problem, in one embodiment, the VFS is re-configured to push written data to disk as soon as practical by syncing the file to disk. Keeping most pages in memory clean in this manner will ensure sufficient readily-available memory for memory allocations.

Operating systems may also tend to keep disk cache pages around in memory to act as a disk read cache. This feature may not be beneficial for caching of the streaming media files, since these files are much larger than memory, and very little can be retained. In one embodiment, the VFS 1710 identifies large streaming reads or writes, and adopts a drop-behind policy for those pages (e.g., the pages are kept cached in memory, but they're also the first candidates for replacement if anything else needs memory).

Block Allocation Techniques

The file system 1720 is responsible for laying out files on disk. One of the important functions of the file system is to decide where to place data on the disk. By default, the file system may attempt to keep a file contiguous on disk. It may use at least two mechanisms to accomplish this: First, it uses the notion of a goal block for allocation. When writing the file, the goal block is set to the last block written to the file, which naturally makes further writes congregate in the same areas on disk. Second, it notices when writes to a file are consistently appended to the end, and uses pre-allocation to reserve large linear chunks of disk space. This gives the goal-seeking algorithm a much better chance of allocating linear contiguous blocks.

One example of these block allocation functions in operation will be described with respect to FIG. 18*a*, which shows four files, Files A–D, being written out to disk. If the first portion of File A is written to Block 1800, then the goal block for the next portion of File A will be block 1801 according to the goal-block function. In addition, once the first block 1800 is written out, the pre-allocation function may "look ahead" and reserve several blocks in succession for storing File A (e.g., blocks 1801–1804). As illustrated, the same functions are concurrently applied to Files B–D, resulting in four contiguous sets of blocks 1800–1804; 1810–1814; 1820–1824; and 1830–1834 for storing Files A–D, respectively.

While having four contiguous chunks of data for each of the four files may be beneficial when reading the files from disk one at a time, it generates a significant amount of seeking while writing the four files. For example, once Block 1800 is written for File A, the drive head must seek to Block 1810 for File B, then Block 1820 for File C and Block 1830 for File D before seeking back to write Block 1801 for File A.

This seeking may degrade system performance, particularly with respect to embodiments of the invention which concurrently store numerous (e.g., 20, 30, 40, . . . etc) programs at once. As mentioned above, seeking degrades system performance. As such, in one embodiment, the goal-seeking algorithm is modified to use the last written block in a group of files as the goal (as opposed to the last written block for each individual file).

Figure 18B:
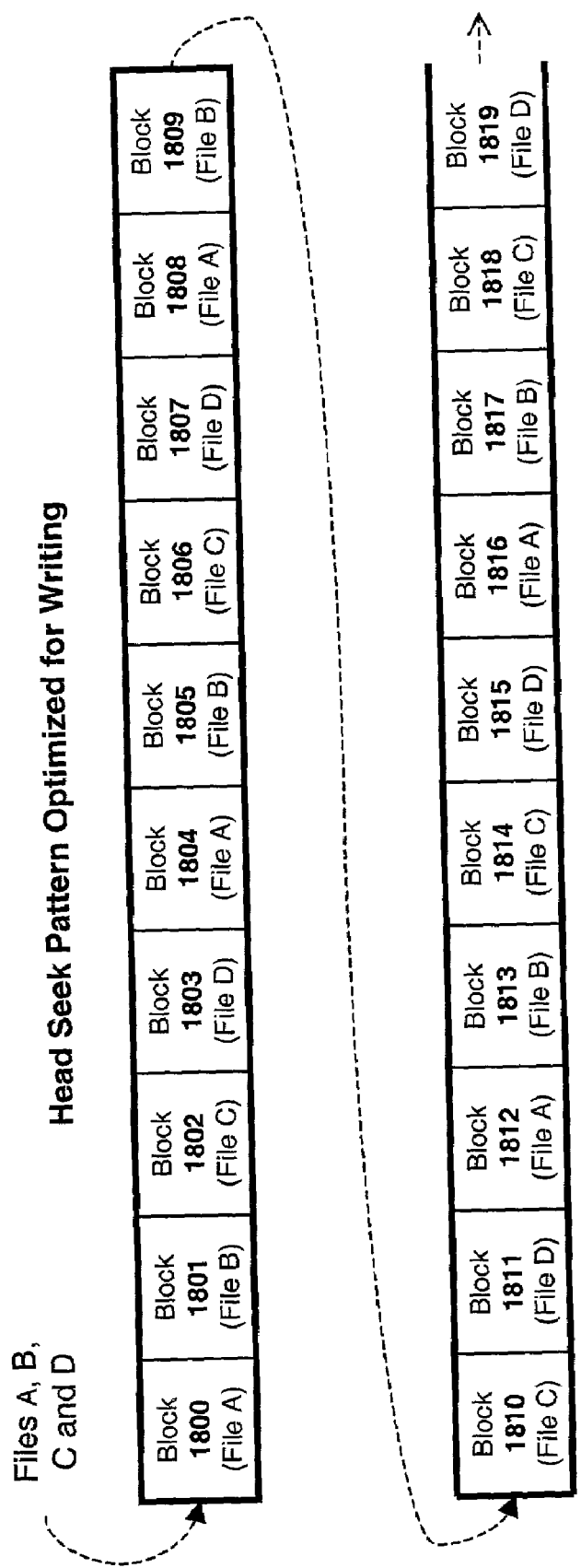
Figure 19:
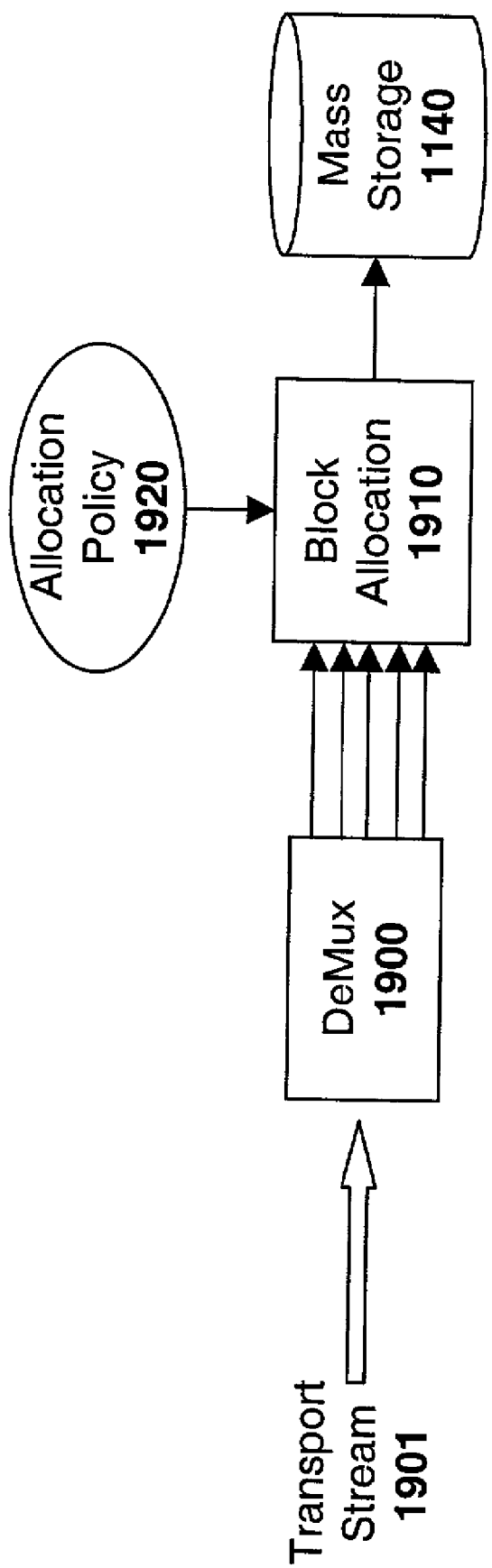
FIG. 19 illustrates an embodiment of a system for implementing a particular block allocation policy.

As illustrated in FIG. 19, this function may be provided via a block allocation module 1910 which receives the set of demultiplexed files and writes those files to disk using a modified block allocation policy 1920. The results of the modified policy are illustrated in FIG. 18*b* in which Files A–D are interleaved on the disk. In other words, the files are written to disk as a group rather than as independent units. As such, the first portion of File A is Block 1800, followed by the first portions of files B through D written to consecutive Blocks 1801 to 1803, respectively. The second portion of Block A is then written to Block 1804 followed by the second portions of Blocks B through D being written to Blocks 1805 to 1807, respectively (and so on). As the blocks are written out, the pre-allocation function may reserve numerous successive blocks for storing the group of files (e.g., Blocks 1801 through 1819).

It should be noted that the "blocks" described above with respect to FIGS. 18*a*–*b* and 19 may be file system blocks, device blocks or any other logical "chunks" of data, depending on the system configuration. Moreover, the chunk size may be modified dynamically based on system variables such as the performance characteristics of the hard drive (e.g., seek time, rotation speed, etc) and/or the number of multimedia streams being processed and stored concurrently. The underlying principles of the invention remain the same regardless of the particular data chunk size.

The net result is that numerous files are concurrently written to disk with a minimal amount of seeking. Given the massive amount of writing required to process the multiple incoming transport streams, optimizing disk writes as described may improve overall system performance. In one particular embodiment, only disk writes to the first partition 1610 will interleave the streams as illustrated in FIG. 18*b*; the writes to the second partition 1620 will employ the standard block allocation policy as illustrated in FIG. 18*a*.

Pre-Allocation of Meta-Data

As mentioned above, there may be issues with the I/O behavior of large file deletions. The file system needs to maintain metadata to remember where it has stored all the blocks in a file. One particular type of metadata (used by the Linux operating system) is illustrated in FIG. 19. It should be noted, however, that the underlying principles of the invention may be employed using various other types of metadata (e.g., metadata used to track file locations in DOS is known as the file allocation table ("FAT").

An I-node 2010, the primary metadata structure, contains pointers to up to 12 file system blocks of data. File systems blocks, which are 4 Kbytes in size, should be distinguished from physical device blocks (e.g., hard disk blocks). File system blocks are layered on top of physical device blocks. For example, if the file system has 4 k blocks and the device has 512 byte blocks, then each file system block will use 8 contiguous blocks on the device. This means that the file system manages the disk blocks in groups of 8.

If a file contains more than 12 file system blocks of data (12*4 Kbytes=48 Kbytes), then this data is identified by a pointer to an indirect metadata block 2030 and possibly a doubly-indirect metadata block 2050. The indirect metadata block 2030 points to up to 1024 additional data blocks 2040 (1024×4 Kbytes=4096 Kbytes) and the doubly-indirect data block points to an additional 1024 indirect metadata blocks 2060, each of which point to an additional 1024 file system blocks 2070 (resulting in an additional 1024*1024*4 Kbytes=4,194,304 Kbytes or about 4.2 Gbytes). Triple indirect blocks (not shown) which point to doubly-indirect blocks may also be provided within the I-node.

Figure 20:
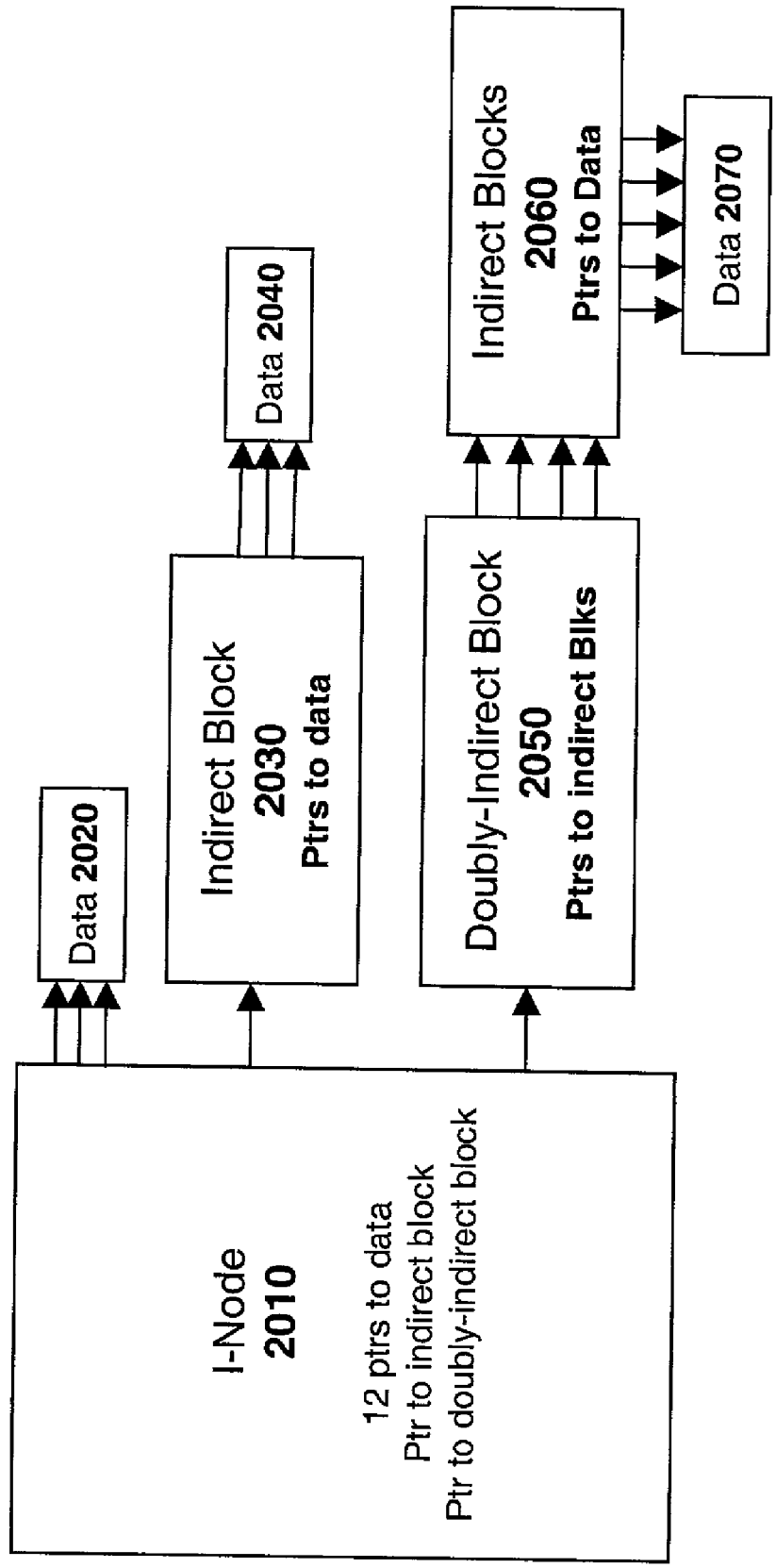
FIG. 20 illustrates metadata for identifying files according to one embodiment of the invention.
Figure 21:
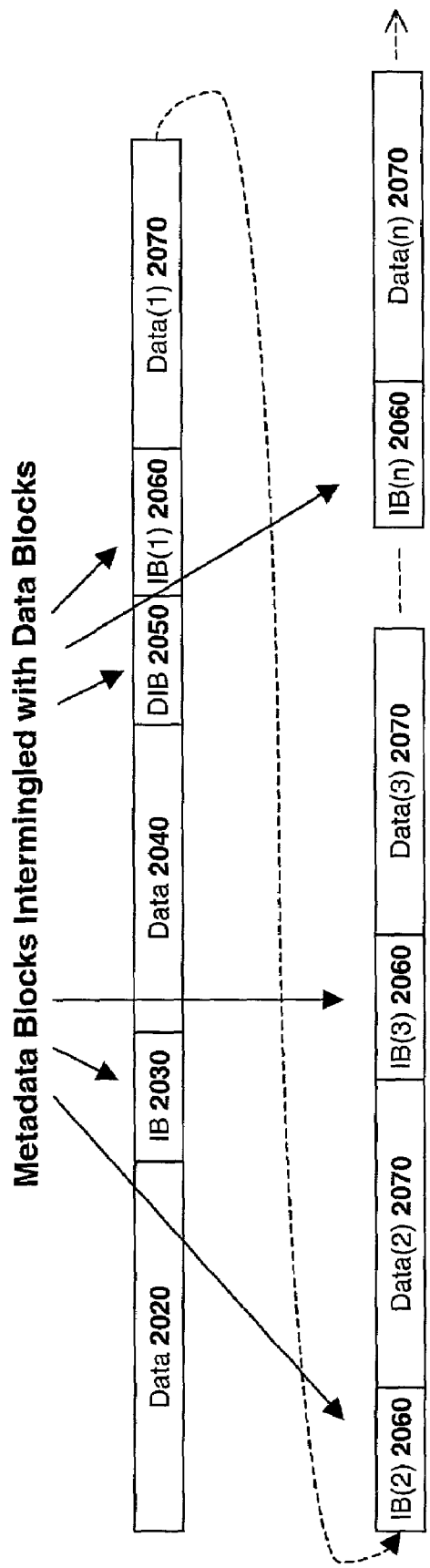
FIG. 21 illustrates an embodiment in which metadata is interlaced within the data.

In operation, as a file is written out to disk, the metadata blocks are generally placed mingled among the data they represent, so there is no seek latency while the file is read or written. For example, FIG. 21 illustrates how the metadata from FIG. 20 will typically be written out to disk along with the data. However, for large files, this means that the metadata blocks are scattered throughout the disk. As a result, in order to delete the file, the file system must find (i.e., seek to) all metadata blocks in order to free the data blocks, resulting in an unavoidable large burst of seeks during file deletions. For example, on a file system with 4 k blocks, a 5 Gbyte file needs about 1300 metadata blocks, which are scattered among the file data blocks. The end result is that when this file is deleted, it will require about 1300 seeks, with each seek resulting in a single block read.

Figure 22:
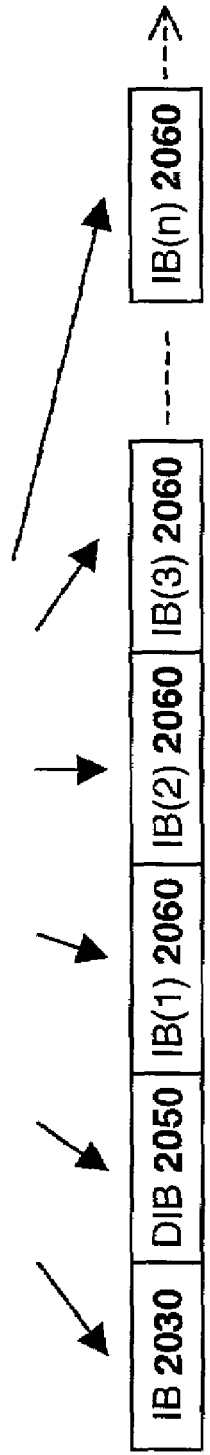
FIG. 22 illustrates an embodiment in which the metadata is pre-allocated at the beginning of the file.
Figure 22:
Figure 22:
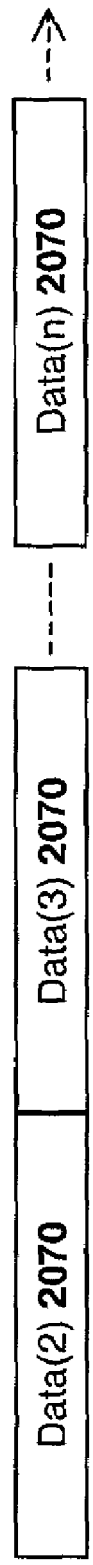

To address this issue, in one embodiment, the metadata blocks for each multimedia file are pre-allocated at file creation time. Thus, as illustrated in FIG. 22, the metadata is clustered together at the start of the file, and is therefore much easier to locate during file deletion (i.e., without excessive seeking). One potential downside of this configuration is the need to continually seek to the start of the file while performing a streaming read or write. However, since a new metadata access will only be needed every 4 Mbytes or so of transfer (i.e., 4 Kbytes/block*1024 blocks/indirect block=4.096 Mbytes), the latency can be absorbed with a small amount of buffering. In one embodiment, the metadata blocks are cached in memory during the streaming read/write to further reduce the seek latency. This is an efficient tradeoff when compared to the buffering required to cover the (potentially) many seconds of seeking during a delete.

Metadata pre-allocation may occur incrementally, after a certain amount of data for a file has been written out to disk. For example, in one embodiment, metadata representing up to 1 Gbyte of data may initially be pre-allocated. If the file grows beyond the 1 Gbyte limit, a second chunk of metadata may be pre-allocated (and so on, until the entire file is written to disk).

In one embodiment, the decision as to whether to pre-allocate the metadata blocks is based on the anticipated size of the file. For example, if the file is a 1-hour video program, then pre-allocation of the meta-data blocks may be advantageous. However, if the file is simply 15 minutes of low quality audio, then pre-allocation may not be performed.

Disk I/O Priority

The block device layer in most operating systems (including Linux) implements an elevator policy when scheduling blocks to a disk. The elevator policy provides good performance for both throughput and fairness, but does not give any blocks preferential treatment. One embodiment of the invention includes a block scheduler which allows the standard "elevator policy" algorithm to be replaced to handle different access patterns. In addition to sorting requests by block number, the scheduler infrastructure allows requests to be tagged with a priority and/or a time deadline.

Disk I/O requests for certain time-critical functions (e.g., real time streaming) are given a higher priority (and/or a shorter deadline) then non-time critical functions (e.g., CD ripping, database updates, . . . etc). In one embodiment, priority is established via a modification to the file system to allow files to be marked with a priority tag (e.g., either in the file system metadata, or by indicating an open file descriptor as being a streaming file).

Performance Simulations

The following performance simulations are for the purpose of illustration only and should not be read to limit the scope of the present invention.

One useful piece of information is the number of streams the file system and disk can sustain at once. In one embodiment, to measure these variables, an I/O load generator program was developed to illustrate how much delay there is after each buffer transfer. One embodiment of the I/O load generator program is configured to generate read or write load for the file system at a fixed rate. Its basic algorithm is to: (1) get current time; (2) perform I/O; (3) measure the time it took I/O to perform (in absolute time); and (4) delay until it is time for the next buffer transfer.

If the delay is negative, then the I/O subsystem is overrunning its deadlines. If it is positive, the system is not yet saturated. Simulations with 4 to 24 TV shows were run, using buffers of 0.25 to 2 seconds (that is, if it was a 8 Mbit/sec stream, a 2 second buffer is 16 Mbits of memory). 120 seconds after starting the write streams, 4 read streams were started to simulate concurrent access to the media data and exercise inter-file seeking. In these embodiments, spontaneous I/O was not simulated, so the model may not be completely accurate. However, spontaneous I/O may also be included within the simulation while still complying with the underlying principles of the invention. The expectation is that as the load increases, the amount of delay time after each I/O will decrease until the system is saturated.

FIG. 23 shows the results of one embodiment of the simulation. This graph is somewhat misleading, as it shows a linear interpolation as the number of streams and buffer size changes. In practice, there were very large non-linearities in the time for I/O to be performed as the system became overloaded. The general pattern was: If the system could cope with the I/O load, then it had plenty of time left over. If the system approached its limit, some I/O operations were subjected to extreme delay.

This suggests a problem in the Linux I/O scheduler, which caused some I/O operations to be come stalled for very long periods of time (up to 45 seconds), causing starvation. Since the total throughput (72 Mbits/s, or around 8.5 Mbytes/s) is nowhere near the throughput capacity of the drive, the immediate solution to the starvation problem is to use sufficient buffer memory. As FIG. 23 shows, 2 seconds of buffering (about 17.1 Mbytes of memory) was sufficient to deal with 24 streams.

Another factor which was tested is whether there would be a problem with increasing fragmentation over time in the initial transport stream partition 1610. As described above, such fragmentation could gradually decrease performance over time, by scattering free space widely on the partition, making any file written into the free space slow to access due to increased seeking.

The expected pattern is that a number of shows are recorded simultaneously off one transponder and are therefore intermixed on disk. Having been recorded, some are deleted quickly and others may have a longer life. Since the files are recorded together but have different lifetimes before deletion, the remaining free space may be scattered among the files which still exist.

A simulation was created using 10 files in an empty file system, each simulating a 90 minute TV show recorded at various bit-rates ranging from 2 Mbits/sec to 7.2 Mbits/sec. Then, 20 iterations were performed of deleting half the files (chosen at random), replacing them with 5 new files at different randomly selected bit-rates. After each iteration (including the initial setup), the disk blocks which were being used for each part of each file were recorded.

The results are illustrated in FIG. 24. While the extent size is generally not very large (hardly any are larger than 160–200 blocks), the strongest peak over all passes is at 150 blocks. This corresponds with the 600 k buffer size used for writing, and suggests that the write buffer size has a direct impact on on-disk fragmentation.

FIG. 25 shows that even though the extents are not very long, they have strong locality. Almost all seeks are within 2000 blocks, with very strong peaks under 500 blocks. There is very little qualitative change over the 20 passes, which indicates that long-term use will not lead to significant fragmentation.

Hardware Employed in One Embodiment

As described above, receiving one or more full transponder's worth of data may be very demanding on the disk I/O subsystem, both in terms of I/O throughput and in raw disk capacity. I/O throughput is stressed in two dimensions: in raw transfer rate, and random access performance.

As a general rule, a 7200 RPM drive will perform better than an otherwise identical 5400 RPM drive. This is not only because the raw transfer rate is higher, but because the rotational latency is lower. Increasing the bit density on the disk, such as a 40 Gbyte/platter drive compared to a 20 Gbyte/platter drive, will increase raw bit rate, but it will not improve rotational latency. However, it should be understood that the underlying principles of the invention are not limited to any particular hard drive type.

In many cases, buffering in system memory can help absorb random access patterns, and allow the drive to see more linear transfers. For example, if write data can be buffered in memory there's several megabytes pending for a particular file, the drive will achieve close to its maximum throughput (see, e.g., FIG. 25). A trade-off therefore exists for an organization implementing embodiments of the invention described herein as to whether to spend hardware budget on either a faster drive or more memory. The final decision may be based on both technological and economic considerations.

Capacity is generally easier to plan for. If it is assumed that there is a 5–10% overhead from the file system, both for metadata storage and to leave enough free space to make sure the block allocation algorithm has some room to work in (i.e., as the disk becomes completely full, the block allocator is forced to search the whole disk for the blocks it needs, resulting in degraded system performance). Assuming two 27 Mbit/sec transponders, this means that an hour of content will use about 25 Gbytes. Accordingly, around 50 Gbytes should be dedicated to handle two complete transponders for two hours. Obviously, increasing the transponder bitrate will increase this estimate. Embodiments of the invention which deal with the issue of CA decryption of the transport streams (described above) may affect these values.

Most of the work associated with processing the incoming transport streams is raw I/O. However, in an embodiment of the invention with a general purpose CPU, the CPU may be required for the phase of splitting the multiplexed MPEG transport stream into individual shows. This operation may be characterized as a vaguely clever memory copy. In one embodiment, each 188-byte byte transport packet (PID packet) is examined to see which show it belongs to, and is then copied to the appropriate buffer pending transfer to disk. Depending on the number of streams processed and other factors such as the multimedia quality, a substantial memory interface may be required as well as a CPU fast enough to use it.

In one embodiment, the CPU/memory interface is a 300 MHz+MIPs processor, with a 100 MHz+64-bit wide memory interface. However, as previously stated, the specific processor and memory interface used is not pertinent to the underlying principles of the invention. It is estimated that the multiple-stream processing will use about 1–5% of such a configuration's capacity, meaning it will have little impact on all the other tasks the CPU has to perform. If it were much higher (e.g., because the CPU/memory interface is less powerful), the analysis becomes more complex, because cache effects become significant. The values set forth above assume that the bus architecture is a 33 MHz 32-bit PCI bus (although various other bus architectures may be used).

As mentioned above, there is a trade-off between memory capacity and disk performance. The more memory there is for buffering, the more the disk can transfer before having to seek. As the performance simulations described above illustrate, buffer memory has a direct impact on how many simultaneous streams can be processed. For example, in order to reliably process more than 16 simultaneous streams, at least two seconds of buffering is recommended; for fewer streams, 1.5 seconds may be enough.

Because these are buffers for a media type which is not otherwise present on the system (CA-encrypted transport stream), in one embodiment, these buffers are distinct from any other buffers the MRA maintains while the incoming transport streams are active.

The other obvious hardware requirement is that there are sufficient transport processors to deal with all operations in parallel. In one embodiment, the system should be capable of receiving incoming transport streams, running a show through CA and do MPEG decode/playback at the same time. Some MPEG-2 decoders designed for cable TV and satellite transports require a transport processor for each of these functions, and therefore need six transport processors to deal with two transponders. Since some decoders only have four transport processors on-chip, external transport processors may be configured in the system to handle the incoming signal.

Transport processors generally have the ability to do some degree of PID filtering in hardware as well. However, system demands will dictate whether this functions is used. Assuming that the stream-splitting were performed by hardware, a copy might still be required as part of the transfer to disk. Moreover, the incremental cost of performing the stream-splitting is insignificant.

Processing multiple streams as described herein may introduce a number of engineering risks. By adding much more contention on shared disk performance, there is an increased coupling between otherwise independent modules. Moreover, the coupling is implicit and non-local, which may tend to make performance problems hard to track down. By pushing the hardware much closer to its absolute limits, much more time will be needed in performance optimization and tuning in order to realize consistent acceptable performance.

This risk may be managed, however, by configuring the various embodiments of the system in an intelligent manner. For example, good quality user-preference data can help avoid wasting resources recording unwanted shows (e.g., such as discarding unnecessary data as described above).

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout this detailed description, for the purposes of explanation, numerous specific details were set forth in order to provide a thorough understanding of the present invention. It will be apparent, however, to one skilled in the art that the system and method may be practiced without some of these specific details. For example, although the description above focuses on MPEG-2 as the preferred compression algorithm, various other compression algorithms may be employed to compress/decompress multimedia content while still complying with the underlying principles of the invention (e.g., MPEG-4, RealVideo® 8, . . . etc).

In other instances, well known structures and functions were not described in elaborate detail in order to avoid obscuring the subject matter of the present invention. For example, although not illustrated, it will be appreciated that various levels of buffering may be included in the embodiments described herein. For example, in the embodiment illustrated in FIG. 11, buffers (e.g., SDRAM, RDRAM, . . . etc) may be configured between the QAM/DPSK modules 1130, 1131 and the mass storage device 1140 and/or between the mass storage device 1140 and the PID filters 1150, 1151. In fact, buffers may be provided in this manner between any of the system modules in order to improve system performance. The buffers may be separate, independent modules and/or may be assigned blocks of addressable space within a single unified memory (e.g., a RAM module shared between the CPU 1185 and other system components). The underlying principles of the invention remain the same regardless of which types of buffers are used.

Accordingly, the scope and spirit of the invention should be judged in terms of the claims which follow.

What is claimed is:

1. A method comprising:
  receiving a broadcast signal containing a plurality of encrypted multimedia channels;
  storing said encrypted multimedia channels in a first hard drive partition;
  decrypting one or more of said encrypted multimedia channels stored in the first hard drive partition to generate one or more decrypted multimedia channels; and
  storing said decrypted multimedia channels to a second hard drive partition prior to rendering said decrypted multimedia channels on a display.

2. The method as in claim 1 wherein said first hard drive partition is optimized for writing data.

3. The method as in claim 2 wherein for N multimedia channels, writing to said first hard drive partition comprises:

writing a first amount of multimedia data equivalent to a block from each of said 1 through N multimedia channels to each of a first N consecutive blocks in said first hard drive partition, respectively.

4. The method as in claim 3 wherein writing to said first hard drive partition further comprises:
writing a second amount of multimedia data equivalent to a block from each of said 1 through N multimedia channels to each of a second N consecutive blocks in said first hard drive partition, respectively, said second N consecutive blocks being the next N consecutive blocks following said first N consecutive blocks.

5. The method as in claim 4 further comprising:
selecting a non-consecutive block if one of said first or second N consecutive blocks are unavailable.

6. The method as in claim 5 wherein said non-consecutive block is selected because jumping to said non-consecutive block will require relatively less seek time when compared with all other non-consecutive blocks.

7. The method as in claim 1 wherein said second hard drive partition is optimized for reading data.

8. The method as in claim 1 further comprising:
reading and decoding one or more of said multimedia channels from said second hard drive partition responsive to a user request to view said one or more multimedia channels.

9. The method as in claim 8 wherein decoding comprises MPEG2 decoding.

10. The method as in claim 1 further comprising:
demultiplexing said multimedia channels prior to storing said decrypted multimedia channels to said second hard drive partition.

11. A method for reducing seek time while concurrently writing N multimedia channels to a mass storage device comprising:
writing a first amount of encrypted multimedia data equivalent to a block from each of said 1 through N multimedia channels to each of a first N consecutive blocks on a first hard drive partition on said mass storage device, respectively;
decrypting the multimedia data stored in the first hard drive partition to generate decrypted multimedia data; and
writing the decrypted multimedia data equivalent to a block from each of said 1 through N multimedia channels to each of a second N consecutive blocks in a second hard drive partition on said mass storage device prior to rendering said decrypted multimedia data on a display.

12. The method as in claim 11 further comprising:
selecting a non-consecutive block if one of said first or second N consecutive blocks are unavailable.

13. The method as in claim 12 wherein said non-consecutive block is selected because jumping to said non-consecutive block will require relatively less seek time when compared with all other non-consecutive blocks.

14. The method as in claim 11 further comprising:
pre-allocating metadata identifying each of said N multimedia channels stored on said mass storage device before writing said first amount of multimedia data for each of said 1 through N multimedia channels.

15. The method as in claim 14 wherein pre-allocating metadata comprises:
estimating an amount of storage space which programs from each of said multimedia channels will consume; and pre-allocating an amount of metadata sufficient to identify said amount of storage space.

16. The method as in claim 14 wherein said metadata comprises an 1-node and one or more indirect blocks.

17. An article of manufacture having program code stored thereon which, when executed by a machine, cause said machine to perform the operations of:
receiving a broadcast signal containing a plurality of encrypted multimedia channels;
storing said encrypted multimedia channels in a first hard drive partition;
decrypting one or more of said encrypted multimedia channels stored in the first hard drive partition to generate one or more decrypted multimedia channels; and
storing said decrypted multimedia channels to a second hard drive partition prior to rendering said decrypted multimedia channels on a display.

18. The article of manufacture as in claim 17 wherein said first hard drive partition is optimized for writing data.

19. The article of manufacture as in claim 18 wherein for N multimedia channels, writing to said first hard drive partition comprises:
wilting a first amount of multimedia data equivalent to a block from each of said 1 through N multimedia channels to each of a first N consecutive blocks in said first hard drive partition, respectively.

20. The article of manufacture as in claim 19 wherein writing to said first hard drive partition further comprises:
writing a second amount of multimedia data equivalent to a block from each of said 1 through N multimedia channels to each of a second N consecutive blocks in said first hard drive partition, respectively, said second N consecutive blocks being the next N consecutive blocks following said first N consecutive blocks.

21. The article of manufacture as in claim 20 including program code to cause said machine to perform the additional operation of:
selecting a non-consecutive block if one of said first or second N consecutive blocks are unavailable.

22. The article of manufacture as in claim 21 wherein said non-consecutive block is selected because jumping to said non-consecutive block will require relatively less seek time when compared with all other non-consecutive blocks.

23. The article of manufacture as in claim 17 wherein said second hard drive partition is optimized for reading data.

24. The article of manufacture as in claim 17 including program code to cause said machine to perform the additional operation of:
reading and decoding one or more of said multimedia channels from said second hard drive partition responsive to a user request to view said one or more multimedia channels.

25. The article of manufacture as in claim 24 wherein decoding comprises MPEG2 decoding.

26. The article of manufacture as in claim 17 including program code to cause said machine to perform the additional operations of:
demultiplexing said multimedia channels prior to storing said decrypted multimedia channels to said second hard drive partition.

27. The method as in claim 17 wherein said first hard drive partition is on a first hard drive and said second hard drive partition is on a second hard drive.

* * * * *